US010689275B2

(12) United States Patent
Huddersman et al.

(10) Patent No.: US 10,689,275 B2
(45) Date of Patent: Jun. 23, 2020

(54) ROTATING CONTACTOR REACTOR

(71) Applicant: De Montfort University, Leicestershire (GB)

(72) Inventors: Katherine Huddersman, Leicestershire (GB); George Chitangyie, Leicestershire (GB)

(73) Assignee: DE MONTFORT UNIVERSITY, Leicestershire (GB)

( * ) Notice: Subject to any disclaimer, the term of this patent is extended or adjusted under 35 U.S.C. 154(b) by 0 days.

(21) Appl. No.: 15/759,731

(22) PCT Filed: Sep. 14, 2016

(86) PCT No.: PCT/GB2016/052849
§ 371 (c)(1),
(2) Date: Mar. 13, 2018

(87) PCT Pub. No.: WO2017/046589
PCT Pub. Date: Mar. 23, 2017

(65) Prior Publication Data
US 2018/0297873 A1    Oct. 18, 2018

(30) Foreign Application Priority Data
Sep. 14, 2015  (GB) .................................. 1516253.0

(51) Int. Cl.
*C02F 1/72*  (2006.01)
*C02F 1/30*  (2006.01)
(Continued)

(52) U.S. Cl.
CPC .............. *C02F 1/725* (2013.01); *C02F 1/302* (2013.01); *C02F 1/32* (2013.01); *C02F 1/42* (2013.01);
(Continued)

(58) Field of Classification Search
CPC .. C02F 1/725; C02F 1/302; C02F 1/32; C02F 1/42; C02F 1/722
See application file for complete search history.

(56) References Cited

U.S. PATENT DOCUMENTS 2,839,194 A * 6/1958 Lopker .................. C01B 25/22
                                                                210/772
3,294,378 A * 12/1966 Grimes .................. B01D 47/16
                                                                261/92
(Continued)

FOREIGN PATENT DOCUMENTS

CH          193 633        10/1937
CH        193633 A  *  10/1937      .............. C02F 1/725
(Continued)

OTHER PUBLICATIONS

PCT/GB2016/052849, International Search Report and WrittenOpinion, dated Dec. 21, 2016, 12 pages—English.

*Primary Examiner* — Chester T Barry
(74) *Attorney, Agent, or Firm* — Andrew F. Young, Esq.; Lackenbach Siegel, LLP

(57) ABSTRACT

The present invention relates to a reactor for the treatment of a liquid stream, the reactor comprising: a liquid stream inlet, a reaction zone for holding the liquid stream, at least one rotating contactor in the reaction zone arranged to rotate through the liquid stream, and a liquid outlet, wherein the at least one rotating contactor includes a fabric mesh.

31 Claims, 10 Drawing Sheets

Figure 1:
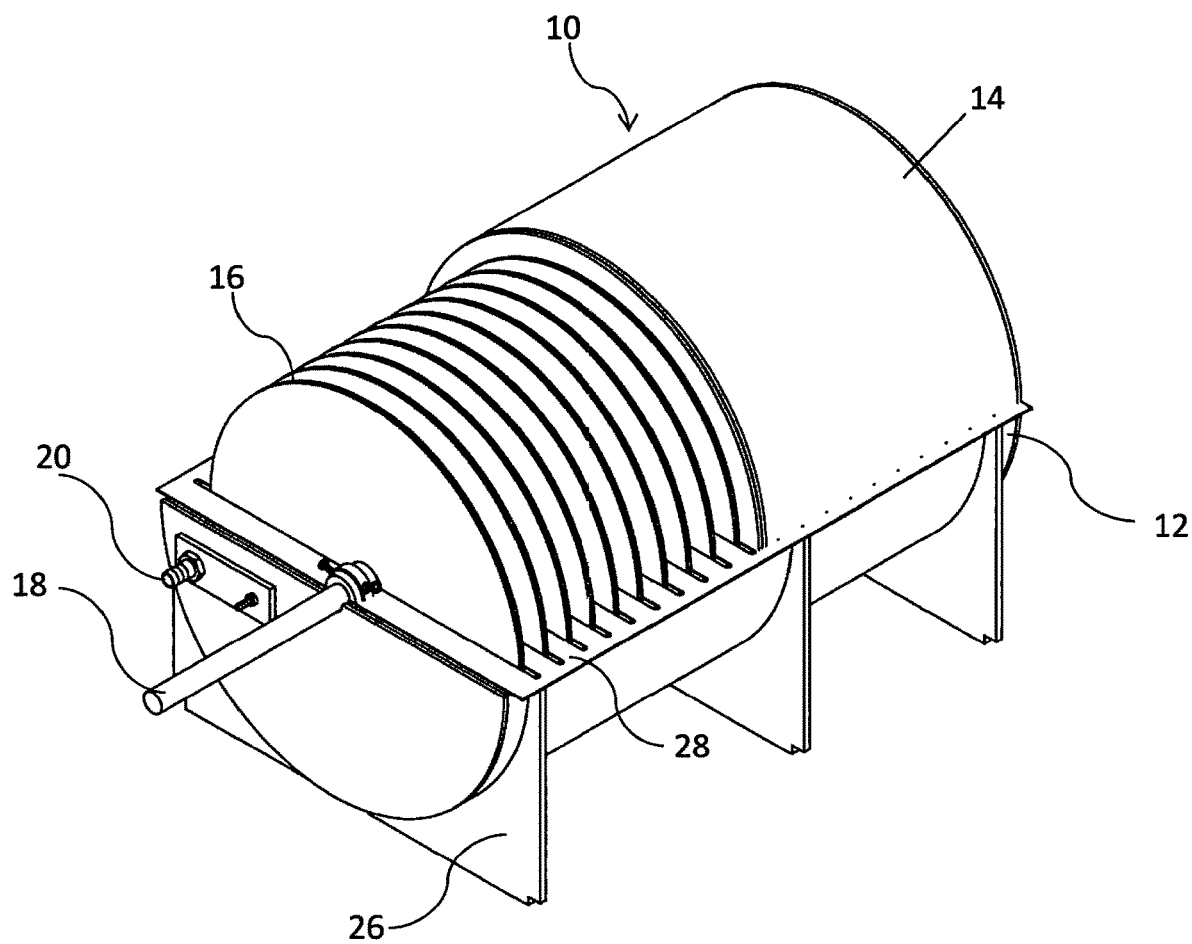

(51) Int. Cl.
*C02F 1/32* (2006.01)
*C02F 1/42* (2006.01)
*C02F 101/20* (2006.01)
*C02F 101/30* (2006.01)
*C02F 103/06* (2006.01)

(52) U.S. Cl.
CPC .......... *C02F 1/722* (2013.01); *C02F 2101/20* (2013.01); *C02F 2101/305* (2013.01); *C02F 2101/306* (2013.01); *C02F 2103/06* (2013.01); *C02F 2209/02* (2013.01); *C02F 2301/024* (2013.01); *C02F 2303/04* (2013.01); *C02F 2303/16* (2013.01); *C02F 2305/023* (2013.01); *C02F 2305/026* (2013.01); *C02F 2305/10* (2013.01); *Y02W 10/37* (2015.05)

(56) References Cited

U.S. PATENT DOCUMENTS

| | | | | |
|---|---|---|---|---|
| 4,038,187 A | * | 7/1977 | Saffran | B01D 33/067 210/108 |
| 4,130,482 A | * | 12/1978 | Torpey | C02F 3/082 210/619 |
| 4,280,913 A | * | 7/1981 | Applegate | B01D 33/067 210/669 |
| 4,284,511 A | * | 8/1981 | Weitzen | B01D 15/00 210/661 |
| 4,333,893 A | * | 6/1982 | Clyde | B01J 16/005 210/150 |
| 4,563,282 A | * | 1/1986 | Wittmann | B01D 36/00 210/151 |
| 4,655,926 A | * | 4/1987 | Chang | C02F 3/34 162/29 |
| 4,869,823 A | * | 9/1989 | Otani | B01D 33/067 210/349 |
| 5,256,570 A | * | 10/1993 | Clyde | C12M 25/02 210/150 |
| 5,342,779 A | * | 8/1994 | Matsumura | A62D 3/02 435/173.8 |
| 5,354,458 A | * | 10/1994 | Wang | B01D 53/46 210/180 |
| 5,582,737 A | * | 12/1996 | Gula | B01J 39/12 204/DIG. 13 |
| 7,344,637 B2 | * | 3/2008 | Frommann | B01D 33/067 210/158 |
| 8,257,592 B2 | * | 9/2012 | Wiemers | B01D 61/022 210/150 |
| 8,460,547 B2 | * | 6/2013 | Sun | A61K 9/0092 210/263 |
| 2010/0267122 A1 | * | 10/2010 | Chinnasamy | C12N 1/12 435/257.3 |
| 2011/0311392 A1 | * | 12/2011 | Shang | B01J 21/063 422/28 |
| 2012/0067796 A1 | * | 3/2012 | Lo | B01J 19/126 210/151 |
| 2012/0125844 A1 | * | 5/2012 | Dongare | A62D 3/11 210/635 |
| 2014/0024091 A1 | * | 1/2014 | Reed | C12P 7/6463 435/135 |
| 2015/0079651 A1 | * | 3/2015 | Burke | C12N 13/00 435/160 |
| 2018/0043345 A1 | * | 2/2018 | Barber | B01D 61/422 |
| 2019/0389901 A1 | * | 12/2019 | Stone | B01D 63/02 |

FOREIGN PATENT DOCUMENTS

| | | | | |
|---|---|---|---|---|
| CN | 101362102 A | * | 2/2009 | |
| DE | 32 14 289 | | 9/1983 | |
| EP | 1 985 359 | | 10/2008 | |
| GB | 1 333 061 | | 10/1973 | |
| GB | 1333061 A | * | 10/1973 | ............. C02F 3/082 |
| GB | 1 401 000 | | 7/1975 | |
| JP | 561 141988 | | 6/1986 | |
| JP | 2009236888 A | * | 10/2009 | |
| WO | WO 02/100782 | | 12/2002 | |
| WO | WO 20061083967 | | 8/2006 | |
| WO | WO 2007/030924 | | 3/2007 | |
| WO | WO 2009/027649 | | 3/2009 | |

* cited by examiner

ROTATING CONTACTOR REACTOR

CROSS REFERENCE TO RELATED APPLICATIONS

This application claims priority from Ser. No. PCT/GB2016/052849 filed Sep. 14, 2016, the entire contents of which are herein incorporated by reference, which in turn claims priority from GB Ser. No. 1516253.0 field Sep. 14, 2015.

FIGURE SELECTED FOR PUBLICATION

FIG. 1

The present invention relates to a reactor and method for the treatment of liquid streams.

The global human population is increasing at an exponential rate, and as a result of this, so is global waste generation. Wth this increase in waste generation, heavy focus is being given to waste treatment technology and waste management, to develop new and improved techniques that may be capable of processing the increasing amount of waste that is to be expected in tomorrow's world.

The treatment of waste water streams is of particular environmental and safety concern. Around the world, waste water contaminated through use in municipal and industrial processes is released into rivers and oceans, resulting in contaminated water. Contaminated water can have severe environmental impacts depending on the contaminants present, and may have an effect on a range of properties such as water acidity, temperature and eutrophication. Contaminated waste water can contain toxic substances, and pathogens which can produce waterborne diseases in human or animal hosts.

Many countries around the world have implemented waste water legislation to manage water quality by setting limits for levels of contaminants allowed to be released into the environment or recycled for human consumption.

The treatment of waste water is typically a multistage process, involving primary, secondary and sometimes even tertiary treatment stages.

Currently, the main methods of primary treatment for waste water relate to different variations of settlement or sedimentation processes. Primary treatment processes are used to remove sludge, grease, oils and large particulate matter from waste water.

After the primary treatment stages, waste water is subjected to a secondary treatment stage. Examples of secondary methods of treating waste water streams include the use of Rotating Biological Contactors (RBCs), Trickling filters, Membrane bioreactors, Constructed wetlands, Aerobic granulation, Aerated lagoons, or Activated sludge.

Biological wastewater treatment processes rely on bacteria to remove contaminants. The bacteria are susceptible to being compromised by shock loads, poisoning, temperature, pH variation and generally require long residence times of more than 24 hours.

For water intensive industrial processes, it is often difficult to process waste water at a rate that matches the rate in which the water is being consumed in the process. Waste water treatment can therefore represent a bottle neck in many industrial operations. To compensate for this bottle neck, a greater number of waste stream processing units may be used, or waste stream processing units of a greater capacity may be used. For large chemical plants or municipal treatment works, these processing units can take up a vast amount of space, which could otherwise be used for other operations.

It is therefore an object of the present invention to provide an apparatus and a method for the treatment of liquid streams, capable of processing large liquid stream volumes. It is another object of the present invention to provide an apparatus and a method which can process large waste stream volumes in a small amount of space.

SUMMARY OF INVENTION

According to a first aspect of the present invention there is provided a reactor for the treatment of a liquid stream, the reactor comprising: a liquid stream inlet, a reaction zone for holding the liquid stream, at least one rotating contactor in the reaction zone arranged to rotate through the liquid stream, and a liquid outlet, wherein the at least one rotating contactor includes a fabric mesh.

Preferably, the reaction zone includes a headspace above the liquid stream, and wherein the at least one rotating contactor in the reaction zone is arranged to rotate through the liquid stream and the headspace.

Providing a contactor which rotates through the liquid stream and headspace in this way advantageously allows a layer of liquid from the liquid stream to be formed on the surface of the contactor. Rotating the contactor into a headspace out of the liquid stream provides the layer of liquid on the contactor with an increased residence time on the contactor, allowing more time for chemical reactions relating to the treatment of the liquid stream to take place on the surface of the contactor.

The fabric mesh provides an increased surface area for the liquid in the liquid stream to interact with, and hence increases the rate of reaction taking place on the surface of the at least one rotating contactor. This advantageously allows the reactor to treat higher flow rates of liquid streams, and allows the size of the reactor to be reduced.

Preferably, the reactor further comprises means for introducing microwave energy to the reactor. Preferably, the means for introducing microwave energy are positioned to direct microwave energy into the headspace, and preferably directly onto the at least one rotating contactor. Preferably, the microwaves are introduced to the reactor via one or more ports.

Preferably, the means for introducing microwave energy comprises at least one waveguide. Preferably, if a waveguide is provided, it is configured to introduce and focus microwave energy into the headspace. Preferably, the waveguide has a circular or rectangular cross-section, which may be single or slotted. At least one co-axial line may be used to introduce and focus microwave energy into the headspace. A co-axial line may be used alternatively or in addition to the at least one waveguide.

Introducing microwaves to the reactor in this way enhances the rate of reaction by providing localised heating. The microwaves may be directed generally into the reactor. Alternatively, if the reactor is provided with a headspace, the microwaves may be directed onto the portion of the at least one rotating contactor which is in the headspace.

Preferably, the reactor further comprises one or more means to disperse microwaves around the inside of the reactor which are introduced by the means for introducing microwaves. More preferably the means to disperse the microwaves is a mode stirrer, which may or may not comprise a slotted wave guide.

Preferably, the microwave energy is introduced at an angle θ with respect to a horizontal plane. Preferably, angle θ is from 0-90° with respect to the horizontal plane. More preferably angle θ is from 45-90°, and even more preferably 65-90°.

Preferably, the means for introducing microwave energy are configured to introduce microwave energy at a plurality of locations along a length of the reactor. Preferably, said means for introducing microwave energy are located on one or more of a top, a bottom or a side of the reactor. Preferably, the microwaves are dispersed within the reactor by one or more mode stirrers, reflective plates and/or moving plates, which may optionally be attached to the at least one contactor.

Advantageously, the means to disperse microwaves aids more thorough and even dispersion of the microwaves inside the reactor and reduces the likelihood of any microwave 'hot spots' or 'dead spots' from forming, resulting in more uniform treatment in the reactor.

Preferably, the one or more means to disperse microwaves may be positioned in the headspace of the reactor. Preferably the means to disperse microwaves are positioned near the one or more ports, and more preferably attached to the at least one rotating contactor.

Preferably, the reactor further comprises at least one viewing window configured to be transparent to light but not permeable to microwaves. This advantageously enables a user of the reactor to look inside the reactor without the risk of being exposed to microwave energy.

Preferably, the means for introducing microwave energy comprises one or more of a continuous magnetron, a pulsed magnetron, a solid state power device or any combinations thereof.

Preferably, the reactor comprises means for introducing ultraviolet energy into the reactor. Preferably, said ultraviolet introducing means are configured to focus ultraviolet energy into the headspace (if provided).

The means for introducing ultraviolet energy into the reactor may be positioned anywhere within the reactor (e.g. anywhere in the reaction zone, including in the liquid stream) and may take any suitable form, for example an ultraviolet lamp or sunlight (or a combination thereof). Preferably the means to introduce ultraviolet energy is located in the headspace. More preferably the means to introduce ultraviolet energy is in a close proximity to the at least one contactor, for example said means may be located in between a plurality of rotating contactors.

Ultraviolet energy enables photo-Fenton-like reactions to occur inside the reactor, which ultimately contributes towards the treatment of liquid streams, for example by providing a source of hydroxyl radicals through photolysis of hydrogen peroxide. Hydroxyl radicals aid the decomposition of organic compounds. Ultraviolet energy also aids liquid stream treatment through reduction of transition metal cations e.g. $Fe^{3+}$ ions. UV energy also promotes $Fe^{3+}$ and $Fe^{2+}$ recycling through the use of the photo-Fenton-like reactions, thereby aiding the catalytic reaction.

Preferably, the reaction zone has a volume of at least 5 litres. Preferably, the reactor further comprises one or more baffles. The one or more baffles may be used to create turbulence in the liquid stream and to ensure good mixing of the liquid stream being treated. This advantageously prevents currents from forming within the liquid stream preventing certain areas from avoiding contact with the at least one rotating contactor. Preferably, the reactor further comprises a plate configured to separate the liquid stream from the headspace.

Providing a plate to separate the liquid stream from the headspace has a number of advantages. The presence of the plate to separate the liquid stream from the headspace can prevent liquid from splashing up into the headspace and out of the reactor. In addition to this, if the reactor comprises means for introducing microwaves and/or ultraviolet energy then the plate can be used as a microwave/ultraviolet reflector. Using the plate as a microwave and/or ultraviolet reflector in this way prevents microwaves and/or ultraviolet being absorbed by the bulk liquid in the liquid stream, and keeps the microwaves and/or ultraviolet energy in the headspace so that the at least one rotating contactor may be exposed to more microwave and/or ultraviolet radiation, hence increasing the effect that the microwaves and/or ultraviolet energy has on the treatment of the liquid stream.

Preferably, the reactor further comprises one or more drains configured to drain liquid from the reaction zone. Preferably, the reactor further comprises one or more pumps configured to pump liquid through the reaction zone. Preferably, the reactor further comprises one or more of temperature, pH, flow rate and/or concentration sensors. Preferably, the reactor further comprises one or more microwave sensors.

By introducing microwave energy into the reactor, it is possible that destructive interference of the microwaves will result in there being 'dead spots' inside the reactor, which do not benefit from the heating effect of the microwaves. One or more microwave sensors may be used inside the reactor to advantageously determine whether any dead spots exist inside the reactor during operation. The microwave sensor may have the capability to communicate with the means for introducing microwave energy to the reactor, or communicate to a user of the reactor, so that the direction that the microwaves are introduced may be altered in a way that removes a dead spot which has been identified.

Preferably, the at least one rotating contactor is a disc. Preferably, there are at least two rotating contactors. Preferably, the contactors are evenly spaced apart along a length of the reaction zone or alternatively the contactors may be grouped in banks of irregular or regular sizes.

Preferably, the reactor is manufactured from a material that comprises metal, ceramic, a polymer or mixtures thereof. More preferably, the reactor is manufactured from a material that comprises stainless steel, aluminium, polypropylene, polyethylene, high density polyethylene, polytetrafluoroethylene, poly(methyl methacrylate), glass reinforced plastic, glass, or mixtures thereof.

Preferably, the at least one contactor is manufactured from a material that comprises metal, ceramic, mineral, a polymer or mixtures thereof. More preferably, the at least one contactor is manufactured from a material that comprises stainless steel, aluminium, polypropylene, polyethylene, high density polyethylene, polytetrafluoroethylene, poly(methyl methacrylate), glass reinforced plastic, glass, quartz or mixtures thereof.

Preferably, the fabric mesh is provided on one face of the at least one rotating contactor, and more preferably the fabric mesh is provided on two faces of the contactor. More preferably, the fabric mesh is provided on two or more faces of the at least one contactor.

Preferably, the fabric mesh comprises a catalyst, more preferably a fibrous catalyst, and even more preferably the catalyst comprises a modified polyacrylonitrile (PAN) fibrous catalyst. Advantageously, a catalyst may be selected to aid removal of certain contaminants from a liquid stream, for example to aid removal of organic materials (for example, spores), biofilm, pathogens, metals, salts, ammonia, pesticides, pharmaceuticals, and endocrine disruptors.

A modified PAN fibrous catalyst advantageously provides a metal ligated catalyst which may be used in a continuous flow process, at a wide range of pH values ranging from 2-11, including natural pH (7.5-8.5), at ambient temperature and without the need to remove spent metal.

Providing the catalyst fixed onto the fabric mesh means there is minimal leaching of the catalyst from the contactor into the liquid stream being treated, and therefore almost no sludge is generated. Because the use of the catalyst produces almost no sludge, the requirement for metal sludge removal processes downstream of the reactor is reduced or completely eliminated.

Preferably, the fabric mesh comprises an ion exchange material. Preferably, the ion exchange material comprises a variation of a modified PAN fibrous material comprising ion exchange functional groups. Preferably, the ion exchange functional groups comprise oximes, amides, carboxylates, and amines, and hydrazides. Preferably, the fabric mesh comprises a chelating ion exchange material. Preferably, the chelating ion exchange material comprises a variation of a modified PAN fibrous material comprising chelating ion exchange functional groups.

A chelating ion exchange material advantageously assists the reactor with remediation of liquid streams containing metal cations, for example zinc, lead, iron, manganese, nickel, chromium, cadmium, copper, silver, cobalt, and mercury. The ion exchange material does this by exchanging hydrogen and/or sodium ions on the ion exchange material for metal cations in solution. Once the transition metal has been chelated onto the material then it is possible to form compounds between the transition metal and anions, for example sulphide and/or oxyanions (for example, a chelating ion exchange material incorporating iron can assist in the remediation of liquid streams containing anions, for example, sulphide or oxyanions (for example arsenate, arsenite, chromate, vanadate, selenite and phosphate)).

Preferably, the fabric mesh comprises a microwave absorbing material which may comprise carbon black, multi-walled carbon nanotube (MWCNT), graphite, graphene, titanium dioxide, strontium titanate, ferryl ions, metal oxides, ceramic oxides or mixtures thereof.

Advantageously, the use of a microwave absorbing material on the fabric mesh helps the contactors to attract more of the microwave energy entering the reactor, which increases the heating effect the microwaves have on the at least one rotating contactors, Preferably, the reactor further comprises one or more of a catalyst, ion exchange material, an ultraviolet absorbing material and/or a microwave absorbing material. Preferably, the liquid stream that is to be treated is a waste stream or a waste water stream. In other words, preferably the reactor is configured to treat a waste stream or a waste water stream.

According to a second aspect of the present invention, there is provided a method of treating a liquid stream in a reactor as claimed in any preceding claim, the method comprising the steps of: feeding a liquid stream to the reactor through the liquid stream inlet; holding the liquid stream in the reaction zone for a residence time t1; rotating the one or more contactors in the reaction zone at angular velocity v1, thereby contacting the liquid with the fabric mesh on the contactors; and withdrawing liquid from the reactor through the liquid outlet.

Preferably, the liquid stream is dosed with an oxidant before entering the reaction zone, in the reaction zone and/or after leaving the reaction zone. Advantageously, oxidants (e.g. hydrogen peroxide) are activated by the catalyst to form reactive species such as hydroxyl radicals, which are able to degrade pollutants and kill microorganisms more quickly than an oxidant alone (e.g. if hydrogen peroxide was used without the presence of a catalyst).

Preferably, the oxidant comprises a peroxygen compound, preferably selected from hydrogen peroxide, hydrogen peroxide liberating compounds, hydrogen peroxide-generating compounds, organic and inorganic peroxyacids and salts thereof, or mixtures thereof. The oxidant may alternatively or in addition to a peroxygen compound comprise atmospheric oxygen.

Advantageously, when in the presence of an oxidant, the catalyst can generate, a number of reactive radicals including the hydroxyl radical which then aid the decomposition of organic compounds. It has been found that because the metal is ligated onto the support on the modified PAN catalyst, the catalyst can be used in a continuous flow process for many years before requiring replacement.

Advantageously, the catalyst can be regenerated in-situ. Preferably, the oxidant is dosed in the liquid stream to give an oxidant concentration in the liquid stream of between 0.01-50 g/L of liquid stream, more preferably between 0.1 to 25 g/L of liquid stream, and even more preferably 0.1 to 5 g/L of liquid stream.

Preferably, microwave energy is applied to (or focussed on) the reaction zone, the headspace and/or the at least one rotating contactor.

Preferably, t1 ranges from 0.1-48 hours, more preferably from 0.5-24 hours, even more preferably from 1 to 15 hours.

The microwave frequency used may be any suitable frequency, but preferably the microwave frequency is 2.45 GHz or 915 MHz.

Preferably, the angular velocity v1 is from 0.1-180 degrees/second, more preferably from 3-180 degrees/second, even more preferably from 6-60 degrees/second. Preferably, the temperature in the reaction zone is from 0-70° C., more preferably from 10-50° C., even more preferably from 20-40° C.

Preferably, the pressure in the reaction zone is from 1-60 bar, more preferably from 1-10 bar, even more preferably 1 bar. Preferably, the pressure in the reaction zone is atmospheric. Preferably, the viscosity of the liquid stream is from 0.2 cP-20,000 cP, more preferably from 0.3 cP and 3,000 cP.

Figure 2:
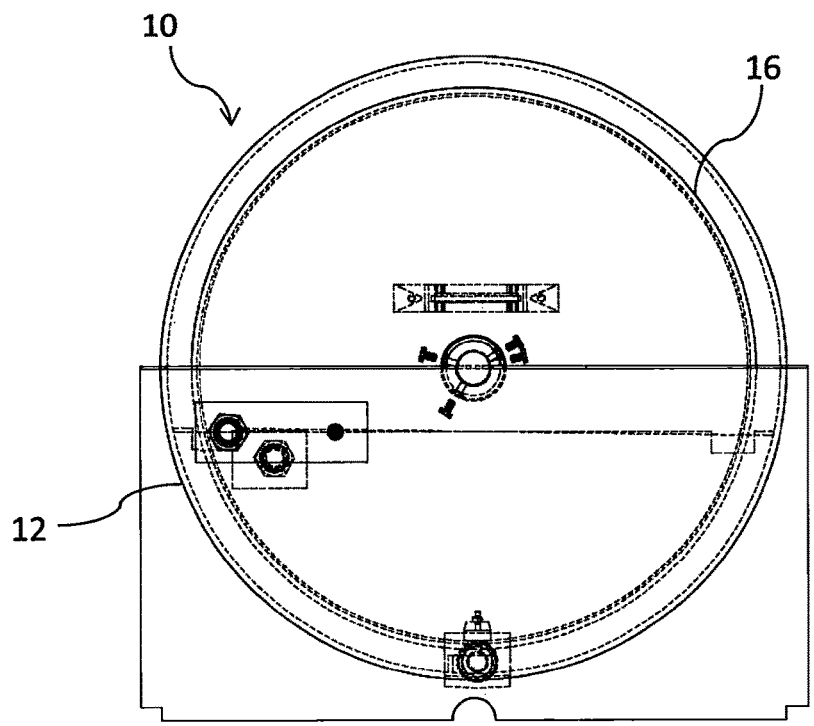
Figure 3:
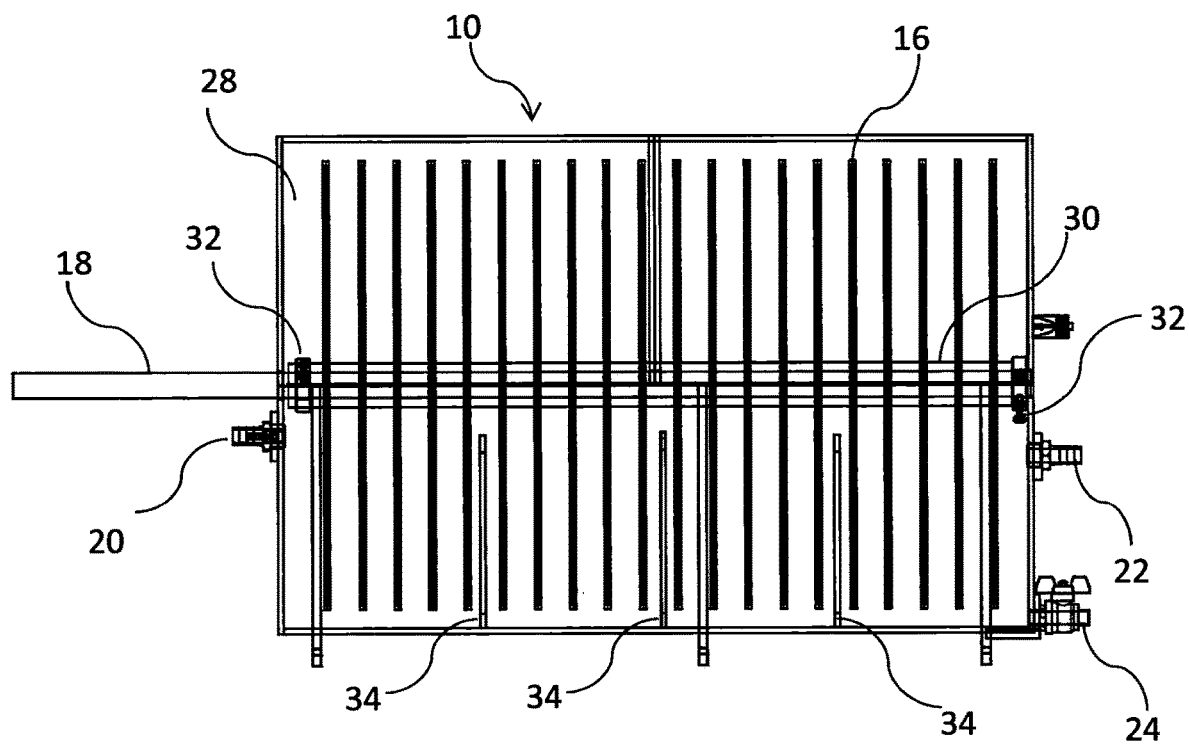
Figure 4:
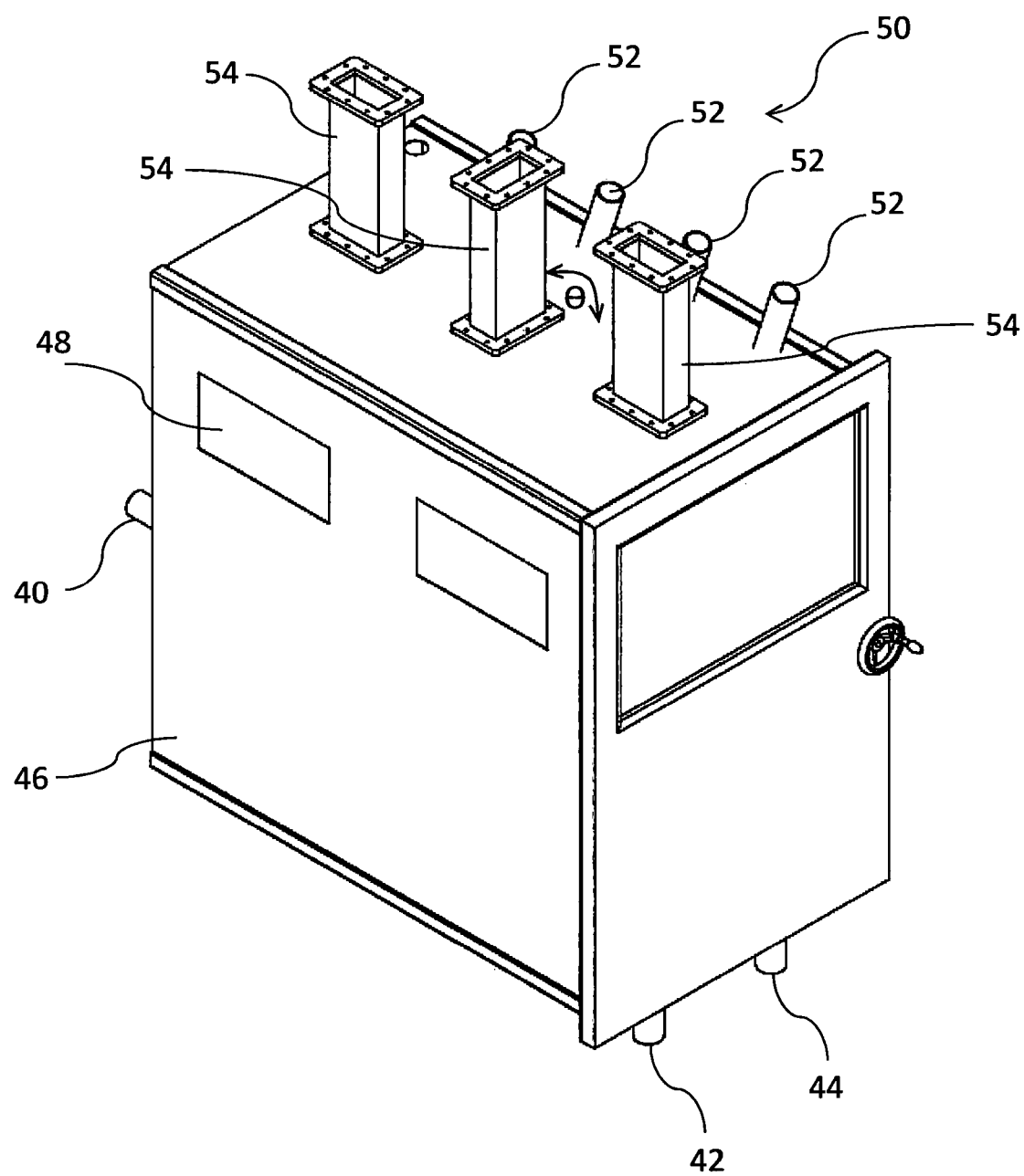
Figure 5:
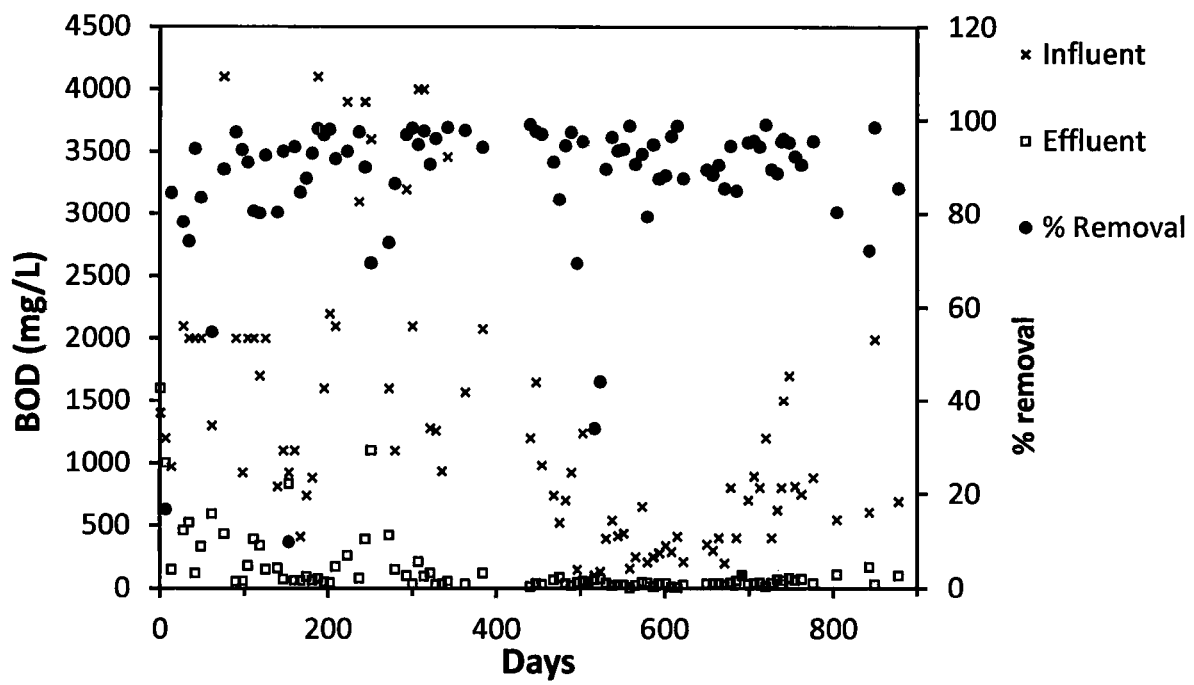
Figure 6:
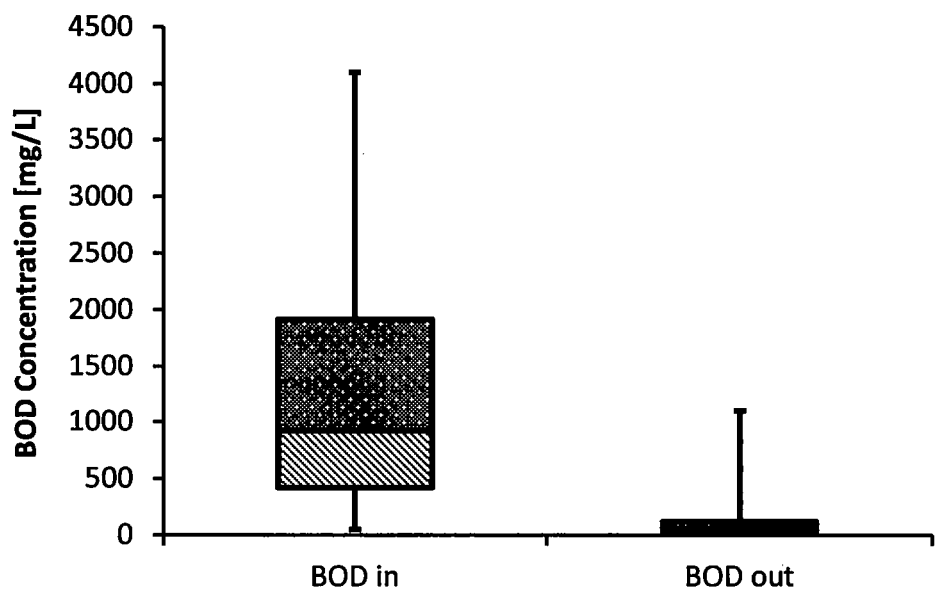
Figure 7:
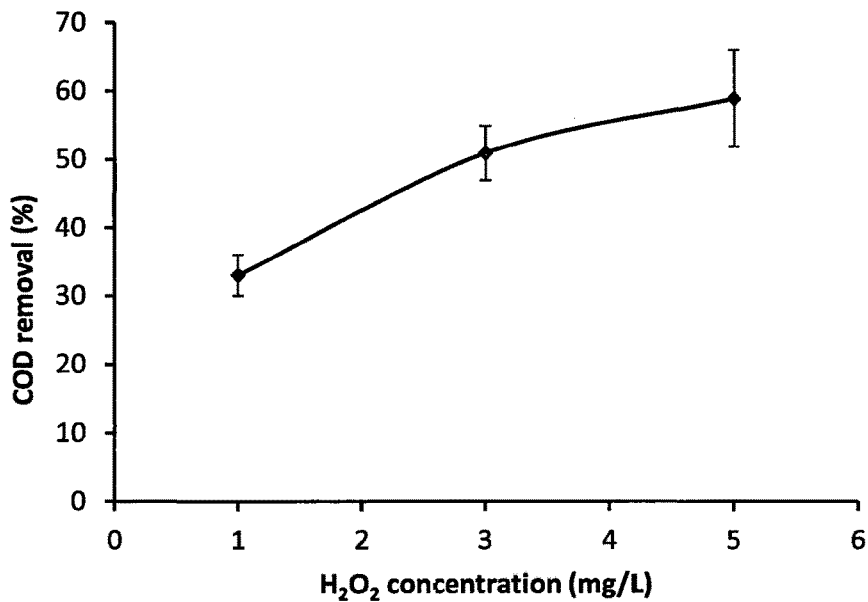
Figure 8:
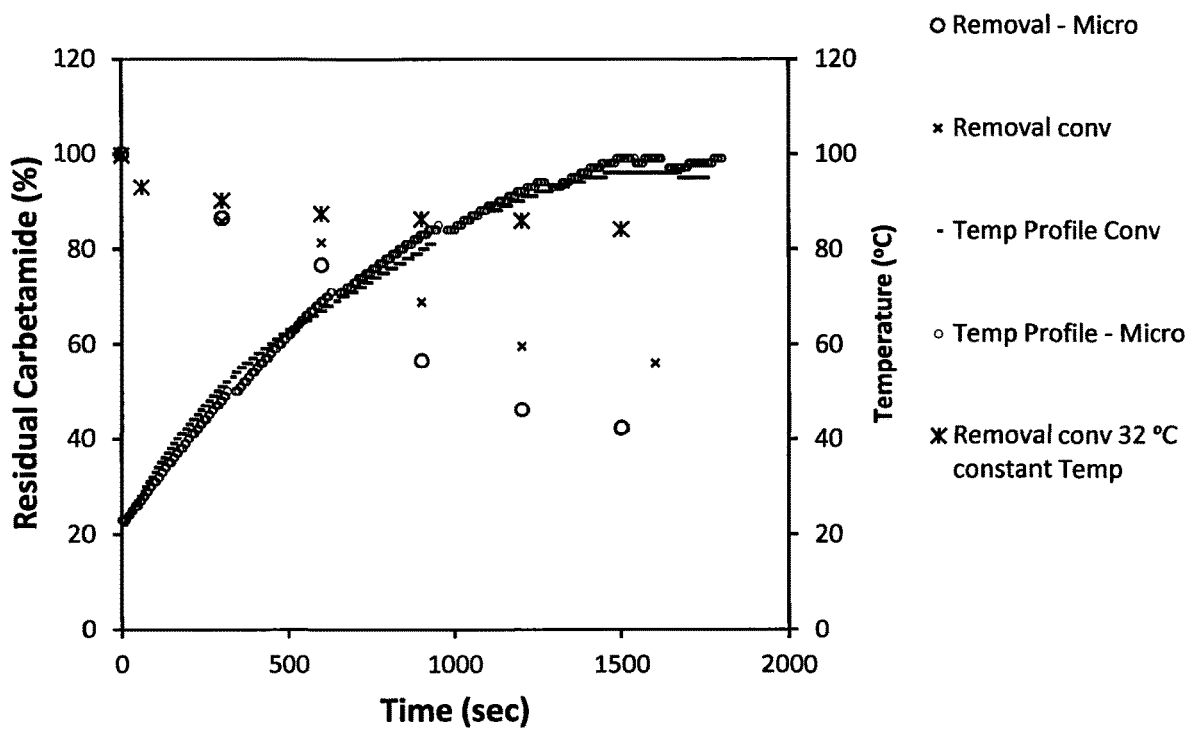
Figure 9:
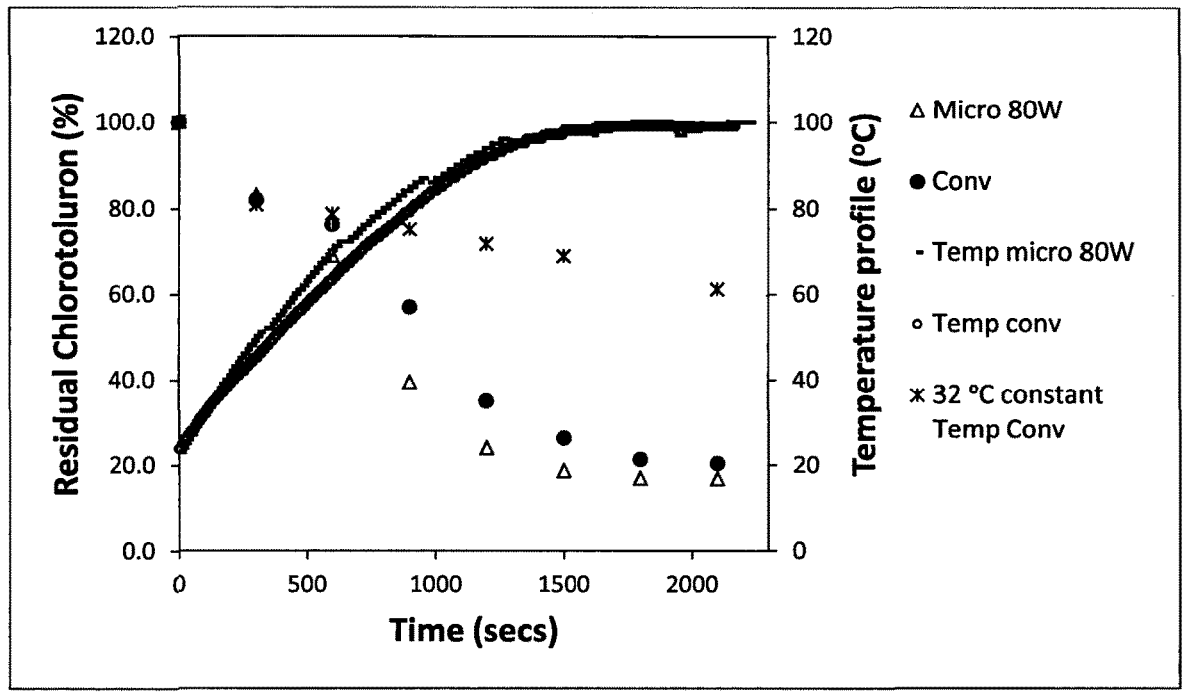
Figure 10:
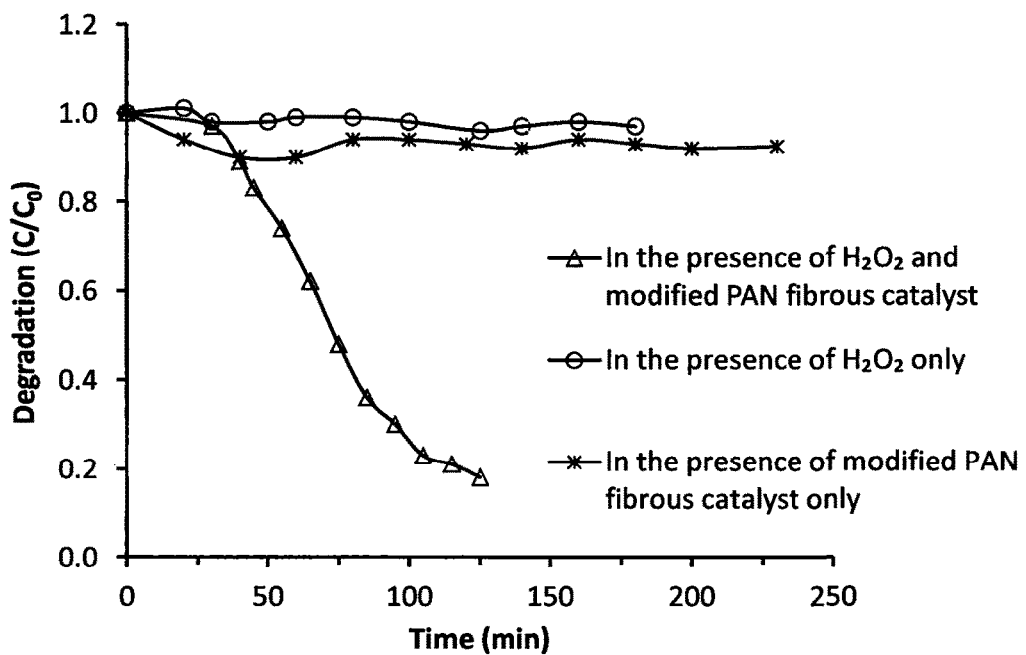
Figure 11:
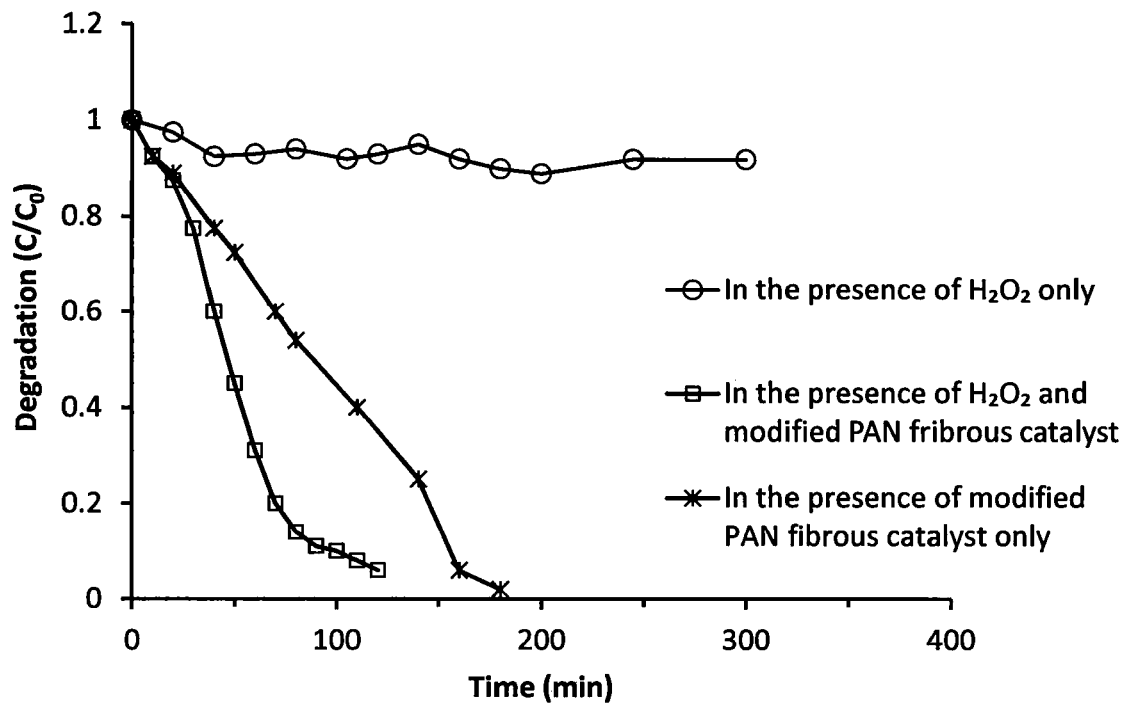
Figure 12:
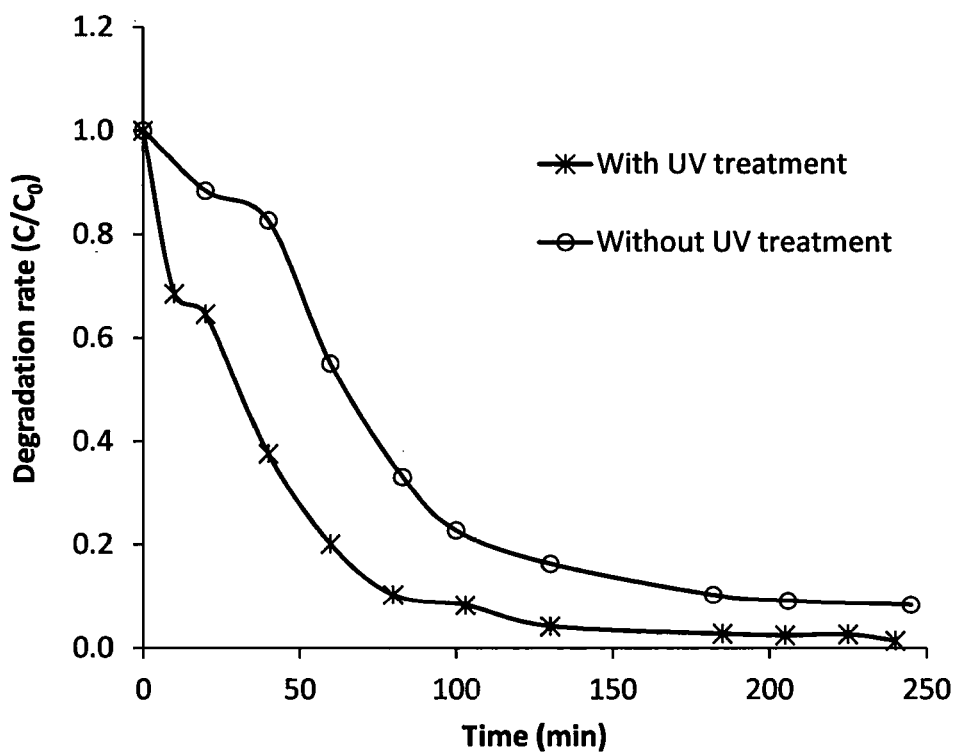
Figure 13:
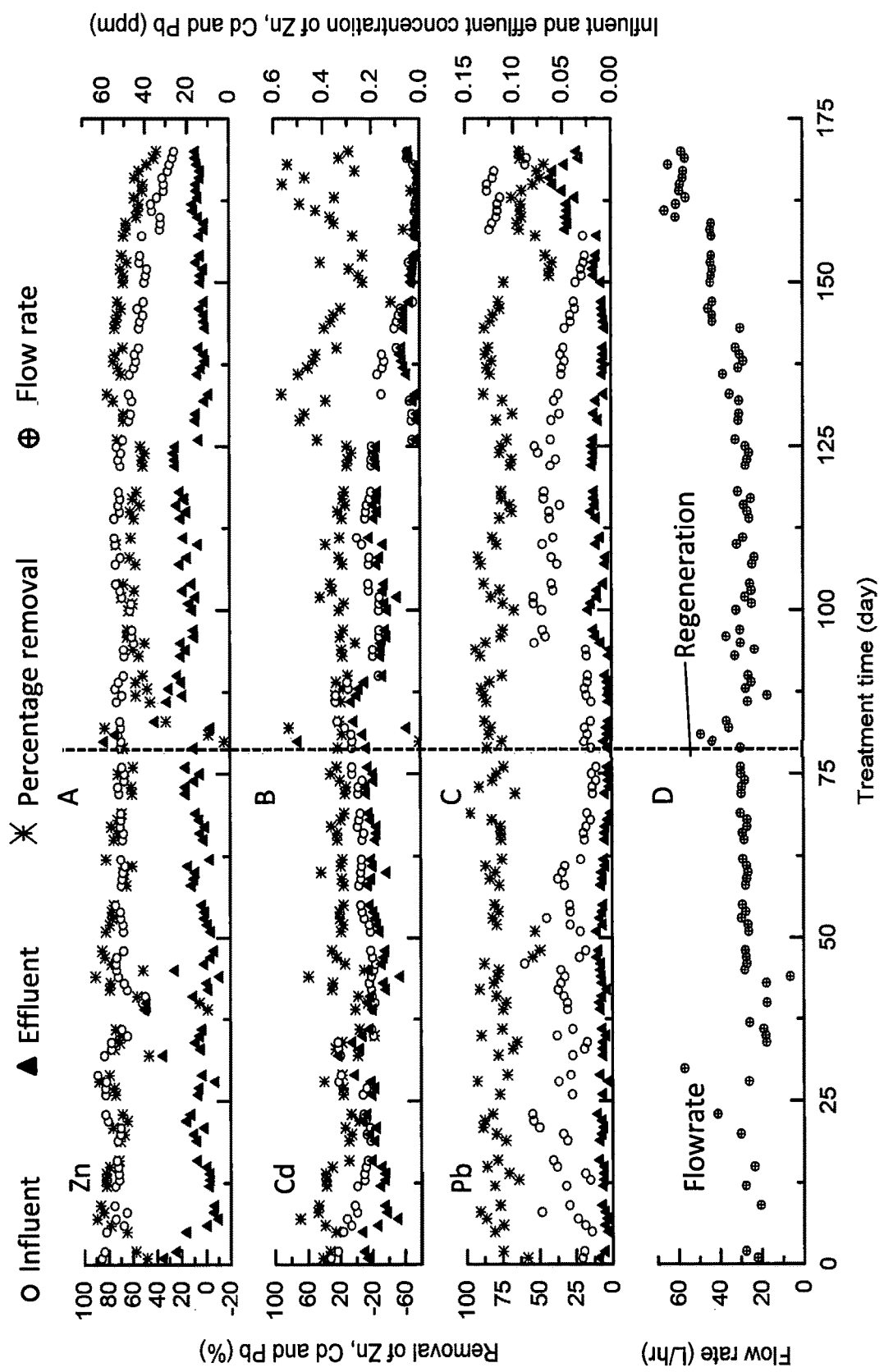
Figure 14:
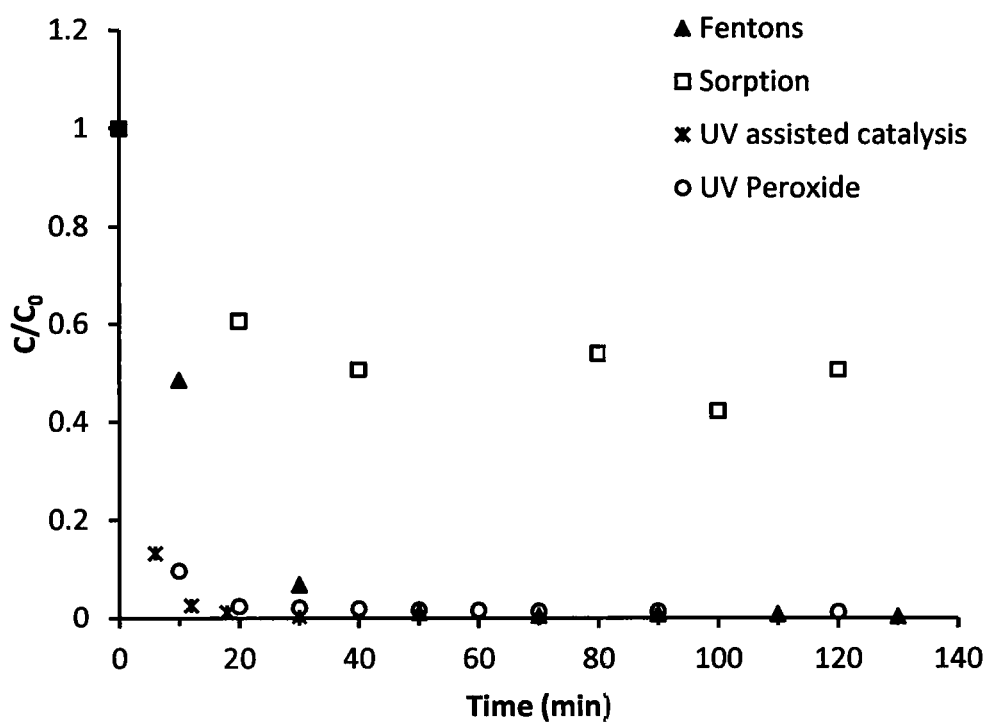
Figure 15:
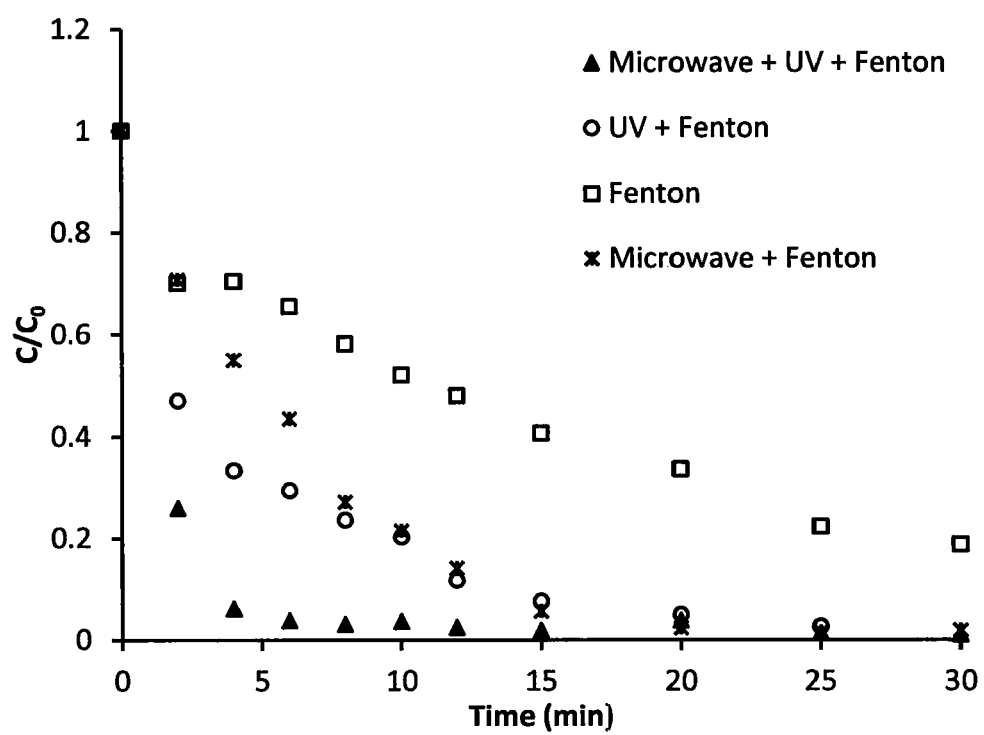
Figure 16:
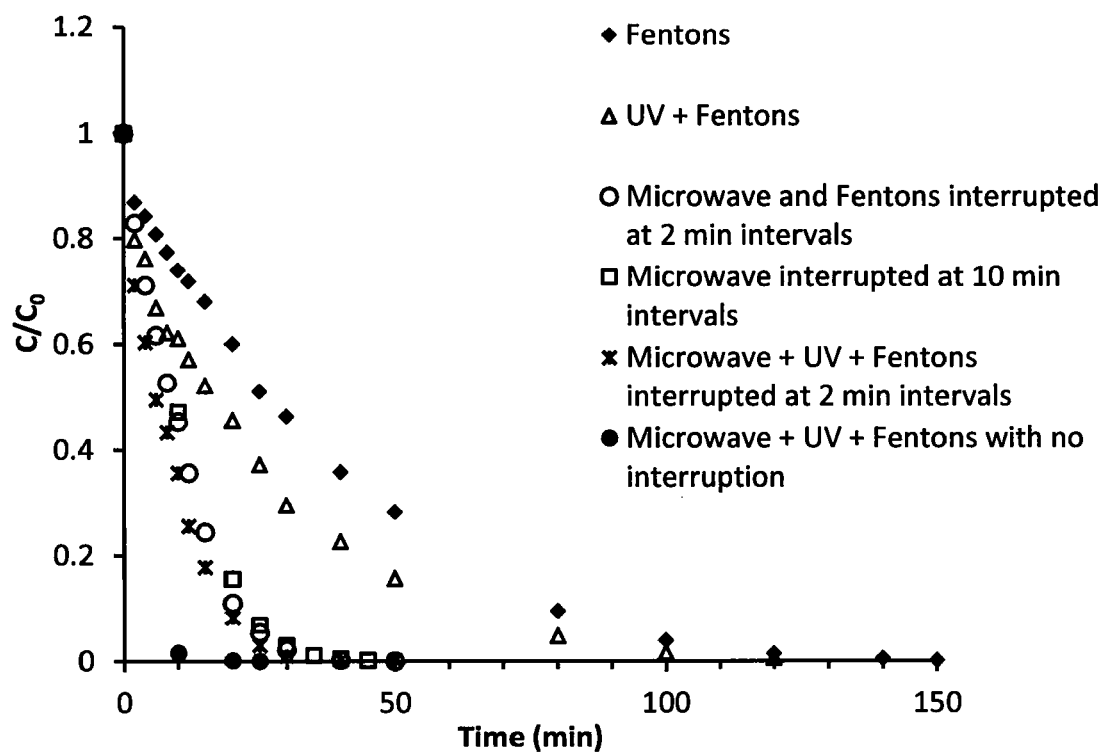

The present invention may be carried out in various ways and an embodiment of a reactor and method for the treatment of liquid streams in accordance with the invention will now be described by way of example with reference to the accompanying drawings, in which:

FIG. 1—is a perspective view of an embodiment of a reactor for the treatment of liquid streams;

FIG. 2—is a lateral cross sectional view of the embodiment of a reactor for the treatment of liquid streams shown in FIG. 1;

FIG. 3—is a longitudinal cross sectional view of the embodiment of a reactor for the treatment of liquid streams shown in FIG. 1;

FIG. 4—is a perspective view of an embodiment of a reactor unit for the treatment of liquid streams;

FIG. 5—is a chart showing the results of Example 1;

FIG. 6—is a chart showing the results of Example 1;

FIG. 7—is a chart showing the results of Example 1 (COD removal as a function of the amount of hydrogen peroxide dosing);

FIG. 8—is a chart showing results of Example 3;

FIG. 9—is a chart showing results of Example 3;

FIGS. 10 to 12—are charts showing the results of Example 5;

FIG. 13—is a chart showing the results of Example 4;

FIG. 14—is a chart showing the results of Example 6;

FIG. 15—is a chart showing the results of Example 7;

FIG. 16—is a chart showing the results of Example 8; and

Figure 17:
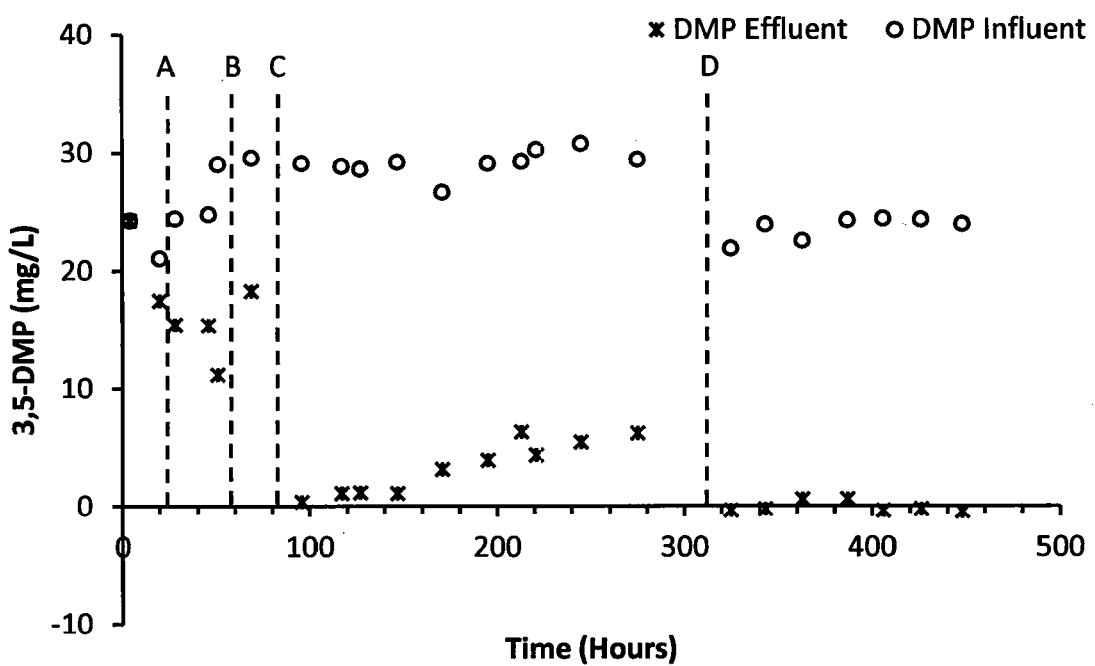

FIG. 17—is a chart showing the results of Example 12.

A reactor according to the present invention for the treatment of liquid streams, for example liquid waste streams, is shown generally in FIGS. 1 to 4 at item 10. The reactor according to the present invention is not limited to the type of liquid stream it is able to treat, for example the reactor could be used to treat liquid streams from sewage works, liquid streams from non-sewage sources, industrial waste liquid streams or mining or landfill leachate, or even combinations of these liquid streams. The reactor described herein is not limited to a specific type of treatment for liquid streams. Treatment could include for example, removing components of liquid streams, providing thermal treatment, providing mechanical treatment or combinations thereof.

The reactor and method is not limited to the type of liquid stream it can treat, in particular what type of contaminants it can remove from liquid streams. The reactor as described herein may for example be configured to remove one or more of bioorganic materials (for example, spores, pathogens or biofilm), metals, salts, ammonia, and/or other organic materials, for example pesticides, de-icing fluids, pharmaceuticals, and endocrine disruptors.

The reactor 10 of FIGS. 1 to 3 comprises a body 12, a hood 14, contactors 16, axle 18, liquid stream inlet 20, liquid outlet 22, drain 24, reactor supports 26, and plate 28.

The body 12 and the hood 14 of FIG. 1 are shown as each being substantially semi-cylindrical. They may alternatively be any other suitable shape which enables the reactor to accommodate a waste stream and also house the contactors 16. Together, the hood 14 and body 12 of the reactor 10 form the reaction zone.

The exemplary embodiment of the reactor 10 shown in FIG. 1 provides a hood 14. The main functions of the hood 14 are to fully contain the contactors 16, to prevent debris from falling into the reactor 10 during operation and causing damage to the reactor (possibly to the contactors 16), and to prevent any of the liquid waste stream from escaping reactor 10. The reactor 10 also provides a plate 28. Plate 28 in one sense has a similar function to hood 14 of preventing any liquid waste stream from escaping reactor 10 (from body 12). Plate 28 may be used in combination with or as an alternative to hood 14. Plate 28 is a plate which fits on top of the body 12, and has a plurality of cut out portions, enabling the contactors 16 to pass through them.

The body 12 is sized such that approximately half of each of the contactors 16 are inside its internal volume. The body 12 may alternatively be sized such that less than half of each of the contactors 16 are inside its internal volume. Conversely, the body 12 may be sized such that more than half of each of the contactors 16 are housed inside the body's internal volume.

The body 12 is configured to support axle 18 along it's longitudinal axis in such a way that axle 18 is able to rotate in clockwise or anti-clockwise directions. The contactors 16 are circular discs. The contactors may comprise any suitable material, for example metal, polymer, ceramic of mixtures thereof. The contactors are used to support a fabric mesh, which may comprise a fibrous solid phase catalyst and/or an ion exchange material. Preferably, the fibrous solid phase catalyst comprises an inorganic metal complex. Even more preferably, the catalyst is a modified polyacrylonitrile (PAN) fibrous catalyst. The fabric mesh may also comprise one or more of polymer fibre composites incorporating metal oxides, and cellulosic and keratinous fibrous materials modified to incorporate a catalyst.

As mentioned above, the mesh may additionally or alternatively comprise a chelating ion-exchange material which has ion-exchange properties for the remediation of waste streams contaminated with metal cations, for example cadmium, chromium, copper, nickel, zinc, lead or mercury, and/or complexation properties for the removal of oxymetal anions of these metals. The ion exchange material may comprise a resin with cation exchange functional groups including carboxylates, oximes, hydrazides, amides, amines and mixtures thereof. The ion exchange material may also comprise a modified polyacrylonitrile ion exchange mesh.

The ion exchange material helps to remove metal cations from the waste stream by exchanging hydrogen and/or sodium on the functional group on the surface of the ion exchange material for the metal cations in solution.

Although the contactors 16 of FIG. 1 are shown as being circular discs, they may alternatively be any other shape, for example the contactors 16 may be circular sectors, eclipse, or regular polygons such as square, rectangular, triangular, pentagonal, hexagonal, octagonal etc. . . . .

The contactors 16 may be complete discs or multiple sectors. The contactors 16 may be of any thickness but are typically 0.5-15 mm in thickness. The contactors 16 are configured so that they can be attached to axle 18.

Axle 18 is configured to support the contactors 16 and hold them still in relation to the axle 18. The contactors 16 may be attached to the axle 18 in any suitable way. The contactors 16 are attached to a sheath 30, which is cylindrical in shape, and which is configured to slide onto axle 18. Sheath 30 is then secured in a fixed position relative to axle 18 using axle screws 32. Alternatively, the contactors 16 may be attached directly onto axle 18. The contactors 16 are spaced apart along the length of the axle 18 in an even arrangement using evenly sized spacers. However, they may alternatively be spaced apart from one another in any irregular arrangement or grouped arrangement using spacers of different sizes.

The body 12 comprises a liquid stream inlet 20 and liquid outlet 22. Inlet 20 and outlet 22 are located on opposing ends of body 12 and are positioned below axle 18. Inlet 20 is substantially to one side of the body 12, however, it could alternatively be positioned anywhere on the body 12. Likewise, outlet 22 may be positioned in any location on body 12. Positioning the inlet 20 and outlet 22 at opposing ends of the body 12 encourages a waste stream to travel the longitudinal length of the body 12, and have maximum contact time with contactors 16. Although FIG. 4 shows that outlet 22 and inlet 20 are substantially the same height relative to the bottom of body 12, outlet 22 may alternatively be positioned lower than inlet 20 from the bottom of body 12, to enhance fluid flow though outlet 22 by gravity.

The body 12 and the hood 14 do not have to be the same in shape. For example, the body 12 may be semi-cylindrical and the hood 14 may be a rectangular prism, or vice versa. The body 12 and hood 14 may be connected together in any suitable way. Preferably, they are provided with flanged surfaces which form an air-tight or water-tight seal.

Although FIGS. 1, 2 and 3 show the inlet 20 and outlet 22 are located on the body 12, they may also be positioned on the hood 14. Alternatively, inlet 20 may be located on the body 12 and outlet 22 may be located on the hood 14, and vice versa.

At least one optional inlet may be provided to one or more of inlet 20, body 12 or hood 14 to enable a user of the reactor to dose a liquid waste stream with chemicals. For example, liquid stream may be dosed with an oxidant (for example, hydrogen peroxide) to assist the liquid stream treatment process.

The body 12 is fitted with reactor supports 26, which are configured to support the reactor 10 in a predefined position. The predefined position shown in FIG. 1 put the reactor 10 in a substantially perpendicular position to a substantially flat surface. However, the reactor supports 26 may be configured such that they raise the proximal or distal ends of the reactor 10 to create an incline or a decline with respect to a substantially flat surface from the inlet 20 to the outlet 22.

The reactor supports 26 of FIG. 1 are in the form of plates that have one face moulded to provide support to body 12, and have an opposing flat face which enables the body 12 (and reactor 10) to stand substantially level on a surface. The reactor supports 26 are positioned such that their planar faces are perpendicular to the longitudinal axis of the body 12, but the reactor supports 26 are not limited to the embodiment shown in FIG. 1, and may take any suitable form to enable them to support the reactor 10 in any desired position. Reactor supports 26 may optionally be fitted with fixing means to allow the reactor 10 to be attached or fixed to an external surface. Such fixing means are not shown on FIGS. 1 to 4, but could be, for example, a flanged surface comprising orifices to receive fixing means, for example a screw, nail or bolt.

Body 12 also comprises internal baffles 34 disposed along it's longitudinal length. The baffles 34 shown on FIG. 3 are substantially the same shape as the lateral cross sectional surface area of the body 12. The baffles are provided to encourage mixing of the waste stream travelling through the reactor. The baffles 34 of FIG. 1 are plate like which do not allow a waste stream to pass through them, and forces the waste stream to travel around. However, the baffles 34 may optionally be provided with perforations (cut out sections), which enable the waste stream to pass through them, whilst still providing turbulence to the waste stream. The example of the reactor 10 shown in FIG. 3 is provided with three baffles 34. However, the reactor of the present invention is not limited to this number of baffles and may alternatively have no baffles or any number of baffles.

A drain 24 is located substantially at the centre bottom portion of the body 12, and is configured to allow the body 12 to be drained of a liquid waste stream if required. The drain 24 may take any suitable form, for example it may be a valve, a tap or a bung. The body 12 may optionally be provided with any number of similar drains and at any location, to enable more effective drainage, or in the case that there are a number of baffles 34, to enable the compartments created by the baffles to be drained.

The material that the body 12, hood 14, axle 18, inlet 20, outlet 22, drain 24, reactor supports 26, baffles 34 are manufactured from may vary depending on what application the reactor 10 is to be used for (i.e. what liquid stream is to be treated). The preferred material of construction for acidic conditions may be different to the preferred material of construction for basic conditions. These components may be manufactured from any suitable materials, for example metals (such as stainless steel), polymers (such as polypropylene, polyethylene, polytetrafluoroethylene, glass reinforced plastic and poly(methyl methacrylate)), glass, quartz, rubbers, wood, or composite materials.

The reactor 10 is provided with means for rotating the axle 18 (and contactors 16 which are attached to the axle 18) inside the reaction zone at a predefined angular velocity. These rotating means may be, for example, an electric motor.

The reactor of the present disclosure may be operated in the following way. A liquid stream to be treated enters reactor 10 via liquid stream inlet 20. Once inside the reactor 10, the liquid stream is held in the reaction zone and comes into contact with the contactors 16 (which as discussed above are formed of discs covered with a fabric mesh comprising a fibrous catalyst and/or ion exchange material).

The contactors 16 are rotated on axle 18 through the liquid stream and headspace in the reaction zone. Due to the nature of the contactors 16, when they are rotated out of the liquid in the reaction zone, they retain a film of the liquid stream on their surface as they are rotated out from the liquid in the body 12. Thus, once a portion of a contactor 16 has been rotated out of the liquid and body 12, it is rotated into the headspace of reactor 10 above liquid.

The rotation of the contactor 16 increases the residence time of the liquid on the contactor. If an oxidant is being used in the process, the increased residence time helps the fibrous catalyst work in combination with the oxidant (e.g. hydrogen peroxide) to produce hydroxyl radicals. These hydroxyl radicals decompose pollutants and kill microorganisms in the film on the contactor via an oxidative break down process, which results in simple organic acids and carbon dioxide.

The waste stream travels along the length of reactor 10 towards outlet 22, where the processed waste stream may be released either directly into the environment, or may be subjected to further downstream treatment.

The residence time of the waste stream inside the reactor 10 may vary, depending on the size of the reactor and the processing requirements (i.e. how much the waste stream needs to be treated). This residence time may be controlled with pumps controlling the flow into the reactor 10 or by valves controlling the outlet treated waste stream flow. In this way, the apparatus may be operated in either a batch or continuous fashion.

The inventors of the present invention have found that during this process, some pollutants are difficult to decompose. To enhance the rate of the catalytic reaction the inventors have found that microwaves may be used to provide localised heating to specific areas of the reactor.

FIG. 4 shows an example of a reactor unit (generally at 50) for the treatment of a liquid stream which is configured to enhance the rate of catalyst reaction using microwaves. Reactor unit 50 may be suitable for example, for use in pilot plants and small scale waste stream treatment operations. The reactor unit 50 is not limited to this scale, and may be much smaller and suitable for use, for example in a laboratory. Alternatively, the reactor unit 50 may be much larger, so that it can be used on large municipal and/or industrial scale.

Reactor unit 50 comprises reactor 10 with an outer cover 46, which is configured to surround the reactor 10. The outer cover 46 may optionally comprise standing means, configured to raise the reactor 10 vertically away from a surface, to act as a stand.

The reactor unit 50 may comprise any number of vents for ventilation and temperature control and/or lighting means such as lamps to illuminate the inside of the reactor unit 50 or reactor 10 to enable a user to view the internal features in low light conditions.

The outer cover 46 is provided with an outer cover inlet 40, an outer cover outlet 42, and an outer cover drain 24, which are configured to receive the inlet 20, outlet 22, and drain 44 lines respectively of the reactor 10. The outer cover inlet 40, outer cover outlet 42 and outer cover drain 44 may be in the form of orifices to allow the passage of process lines (inlet 20, outlet 22, and drain 24 lines) from the reactor 10, or they may be in fluid communication with their respective reactor lines by way of valve(s) or pipe joint(s), pipe connector(s).

The outer cover 46 comprises windows 48 to allow a user to look inside the reactor unit 50 to view internal components (e.g. reactor 10). The windows 48 provided on the exemplary reactor unit 50 in FIG. 4 are optional features. The reactor unit 50 may alternatively be provided with no windows, or any number of windows of different shapes or sizes, and in any position on the outer cover 46. The windows 48 may comprise any suitable material, for example metal wiring/mesh, glass, Teflon, quartz, polymers (e.g. polytetrafluoroethylene), composite mixtures, or mixtures thereof. The windows may, for example, comprise metal wiring/mesh which is covered with glass, quartz, polymers (e.g. polytetrafluoroethylene), composite mixtures or mixtures thereof.

The outer cover 46 of the reactor unit 50 is provided with microwave emitting means (not shown), and a plurality of fixing means (ports) 54 to fix (or support) said microwave emitting means in a fixed position relative to the reactor 10. The microwave emitting means are configured to provide localised heating to specific areas of the reactor 10. These specific areas could be any part of the reactor unit 10, and may be angled at an angle θ. Angle θ on FIG. 4 is substantially 90° with respect to the horizontal plane. However, angle θ may be any suitable angle to enable microwaves into the reactor in a way required by a user. Preferably, the microwave emitting means provides microwaves (microwave energy) to the inside of the reactor 10, even more preferably to the contactors 16. Even more preferably the microwave emitting means provides microwaves to the portion of the contactors 16 present in the headspace (above the liquid in the reaction zone).

The spacing between the fixing ports may vary depending on the frequency of the microwaves emitted by the microwave emitting means and the power. The number of fixing means 54 may also vary, depending on the size of the reactor 10 and outer cover 46 and the required power.

The outer cover 46 of the reactor unit 50 is provided with a plurality of temperature sensor ports 52. The plurality of temperature sensor ports 52 are angled so as to create a suitable focus angle to enable temperature sensors therein (not shown in the figures) to detect the temperature at specific parts inside the reactor. For example, the ports 52 could be angled so that the temperature sensors are able to detect the temperature on the rotating contactors, the plate 28 or any other aspect of the reactor.

The outer cover 46 of the reactor unit 50 is not limited to the number of temperature sensor ports 52 shown in FIG. 4. The outer cover 46 may for example be provided with one or more temperature sensor ports 52.

The fixing means 54, sensor ports 52, outer cover 46, windows 48, outer cover inlet 40, outer cover outlet 42, and the outer cover drain 44 are configured to substantially reduce or completely prevent any microwave radiation escaping the reactor unit 50 during the operation of the microwave emitting means. The fixing means 54, outer cover 46, windows 48, outer cover inlet 40, outer cover outlet 42, and the outer cover drain 44 may be manufactured from any suitable material which enables them to do this, and they may comprise any material which can reflect/contain microwaves, for example stainless steel. Sealing means such as gaskets may also be used to help reduce or completely prevent any microwave radiation escaping the reactor unit 50.

To reduce or completely prevent microwaves from escaping reactor unit 50, the windows 48 may be manufactured from a material which is transparent or semi-transparent and capable of reflecting/containing microwaves. Preferably, the material used for the windows 48 is a microwave grating comprising a plurality of openings, said openings being sized such as to reflect microwaves. Any microwaves escaping the reactor unit 50 would be an environmental and safety concern.

Although the example of the reactor unit 50 in FIG. 4 shows that the fixing means 54 (and hence microwave emitting means) are on the top of the outer cover 46. The reactor unit 50 is not limited to this embodiment and the microwave emitting means may be in any suitable location in the reactor unit 50. The microwave emitting means could alternatively be located on the outer cover 46 or on the reactor 10. The number of microwave emitting means (and fixing means 54) is typically determined by the length of the reactor unit 50 and reactor 10. The distance of separation between the microwave emitting means (and fixing means 54) is determined by the wavelength of the microwave frequency used. Preferably the distance of separation is a multiple of half the wavelength of the microwaves being used (typically twice the wavelength).

To enable microwaves to be conveyed to specific areas of the reactor 10, any part of the reactor 10 may be manufactured from a suitable material or configured to allow the transfer of microwaves. For example, if the reactor 10 has a hood 14, then the hood 14 may be manufactured from a material which allows the transfer of microwaves, for example a suitable metal grating, glass, plastics or mixtures thereof. Alternatively, the reactor 10 may comprise ports to receive microwaves, and let the microwaves enter the reactor 10 (not shown in the figures). Such ports may be on any part of reactor 10, but preferably on the hood 14, and most preferably on the top of the hood 14.

The microwave emitting means may generate microwaves of any suitable frequency by using at least one magnetron, said microwaves may then be distributed into the reactor (or to a port on the reactor) by waveguides or coaxial lines, which directs the microwaves to a specific area of the reactor 10. For example, the microwave emitting means may generate microwaves using a magnetron, said microwaves may then be directed by a waveguide to a port on the hood 14 of reactor 10, where the microwaves are then introduced to the headspace of reactor 10 and the contactors 16.

If a waveguide is used to direct the microwaves to a specific area of the reactor 10, any suitable waveguides may be used, for example rectangular waveguides (WR430 and WR340 for 2.45 GHz microwaves and WR975 and WR915 for 915 MHz microwaves), circular, straight, conical, or slotted waveguides may be used.

A conical shaped waveguide reduces any mismatch between the low impedance of the waveguide and the high impedance of the cavity. Slotted waveguides may be located between the contactors 16 and would allow microwaves to be directed directly onto the faces of the contactors (as opposed to the use of waveguide ports located above or to the side of the contactors, which can result in the contactors getting an uneven exposure of microwaves). The waveguide may be manufactured from any suitable material, and may comprise aluminium, brass, copper, silver or mixtures thereof.

Any microwave frequencies may be used with the apparatus described herein. The microwave source may be chosen to suit the application. Typically, frequencies of 2.45 GHz and 915 MHz are used, and single sources of up to 30 KW and 75 KW may be used for 2.45 GHz and 915 GHz frequencies respectively.

During operation, the microwave emitting means emits microwaves onto the surface of the contactors 16, preferably above the liquid level. The microwaves will impinge on the contactors 16 whilst they rotate in and out of the liquid in the reaction zone. Due to the nature of the contactors 16, when they are rotated out of the liquid, they retain a film of the liquid on their surface as they are rotated out from the liquid in the body 12. Thus, once a portion of a contactor 16 has been rotated out of the liquid and body 12, it is rotated into the headspace of reactor 10, where said portion is subjected to microwaves. The portion of the contactor which is in the waste stream may also be subjected to microwaves. However, due to poor penetration depth of microwaves, the intensity of microwaves experienced by the portion of the contactor 16 inside the liquid will be significantly reduced compared to the portion of the contactor 16 which is in the headspace. The penetration depth of microwaves depends on the wavelength of the microwaves used and the nature of the liquid (or the material the microwaves encounter).

Water is a particularly good absorber of microwaves at frequencies which are normally used in industrial microwave equipment, for example 2.45 GHz and 915 MHz. This may be a problem for the apparatus of the present invention if water is present in a waste stream, as the majority of the microwaves will be absorbed by the water in the bulk waste stream, as opposed to the thin film of waste stream on the contactors and the contactors themselves.

To address this, plate 28 may be provided to reactor 10 to enhance the exposure the contactors (and the thin layer of liquid thereon) have to the microwaves in the headspace of the reactor by providing a barrier, separating the bulk liquid from the headspace. If any microwaves are directed into body 12, plate 28 serves to reflect at least some but preferably most of the microwaves back into the headspace and prevent the microwaves from being absorbed by the bulk liquid.

The contactors and/or fibrous mesh or any composite therein may comprise a material which is specifically designed to absorb microwaves of a certain frequency which is to be used in the apparatus. For example, microwave absorbing materials with high loss tangents such as carbon black, polyvinylidene fluoride (PVDF), ferryl ions, iron pentacarbonyl, titanium dioxide, strontium titanate, graphite, or mixtures thereof. These materials may be incorporated onto the contactors and/or fibrous mesh in micro and/or nano sized particles, or larger sized particles, for example macro particles. Any other suitable materials may be used as microwave absorbers, and may be selected for the specific type of waste stream to be treated. For example, if the waste stream comprises water then ideally a material is selected which has a high absorbance of microwaves at microwave frequencies where water has low microwave absorbance.

These microwave absorbing materials may be incorporated onto or into the contactors and/or fabric mesh in any suitable way. Preferably, the materials are incorporated onto the contactors and/or fabric mesh using knitting, weaving, chemical bonding and/or by incorporation in the mesh before the mesh is modified to produce an ion-exchange or catalytic material.

Preferably, the microwaves are emitted onto the contactors 16 from a distance of 0.05 m to 1 m, preferably 0.1 m to 0.5 m, and more preferably the microwaves are emitted onto the contactors 16 from a distance of 0.25 m, so that the contactors 16 are exposed to a high concentration of the microwave radiation.

The rotational speed of the axle 18 and hence contactors may vary, to vary the residence time that the contactors have in the headspace and the bulk liquid, with or without microwave exposure.

The reactor unit 50 may be fitted with any number of microwave sensors to measure microwave field density at any part of the reactor unit 50.

The microwave emitting means may optionally comprise a mode stirrer and/or a cooling system. The mode stirrer configured to enhance uniform mixing of the microwaves inside the reactor 10 and/or the reactor unit 50, and promote an even microwave field intensity to reduce any microwave hot-spots. The cooling system configured to provide cooling to the microwave emitting means to prevent it from overheating during operation. The microwave emitting means may also comprise electronic communication means, configured to allow the microwave emitting means to transmit information to computer control systems/users and/or receive information (including control instructions) from computer control systems/users or from any other components of the reactor unit 50, for example any microwave sensors, temperature sensors, depth sensors etc. . . . . .

To enable process control, sensors to monitor conditions (temperature, composition of the waste stream/treated waste stream, pH, flow rate, microwave intensity) at the inlet 20, inside the reactor 10, at the outlet 22 and at the ports 52 (as discussed above) may be provided. Any sensors provided may be provided with electronic communication means so that they can transmit and/or receive information from other sensors and/or external devices.

Fibre optic sensors and/or infrared sensors may be used to monitor the temperature at any location in reactor unit 50 (including inside reactor 10). Any temperature sensors may optionally feedback temperature data to a temperature control device, which may then control the temperature within the reactor unit 50 to avoid over heating or under heating of any of the components of the reactor unit 50.

Microwave sensors may be configured to communicate with microwave distribution means (e.g. mode stirrers) to improve microwave distribution inside the reactor unit 50.

The example of a reactor unit 50 according to the present invention (shown in FIG. 4) shows the reactor 10 as being enclosed in the outer cover 46. However, the reactor unit 50 is not limited to this, and may alternatively relate to a reactor unit 50 where the outer cover 46 fits onto reactor 10 in a similar way as the hood 14.

Various modifications may be made to the described embodiment without departing from the scope of invention.

The effectiveness of the reactor and method according to the present invention will now be described by way of example.

Example 1—Treatment of a Waste Stream A

Waste stream A was tapped into an intermediate bulk container (IBC) weekly for temporal storage. The waste stream A in the holding IBC was then pumped, at a predetermined flow rate, into a reactor according to the present invention, which was enclosed in a bunded International Standards Organisation (ISO) container. The treated waste stream A from the reactor was then pumped into a second IBC for temporal storage and subsequently pumped into a main treated waste stream holding tank. As the waste stream A was pumped through the reactor (without any pre-treatment), a hydrogen peroxide stock solution was simultaneously pumped into the reactor at a predetermined flow rate in order to achieve the required peroxide concentration. The hydrogen peroxide stock solution was dosed at two locations: at the inlet of the reactor and immediately after a baffle inside the reactor.

The reactor in Example 1 had a volume of 31 Litres. The reactor comprised 18 internal contactor discs, each 50 cm in diameter and covered on both sides with a solid fibrous modified PAN catalyst mesh. The rotational speed of the contactor discs was 2 rpm. The variables of Example 1 are shown in Table 1 below.

TABLE 1

| | |
|---|---|
| Initial hydrogen peroxide ($H_2O_2$) concentration | 1 g/L, 3 g/L, and 5 g/L |
| Residence time | 14 hrs; 22 hrs |
| Solid fibrous modified PAN catalyst mesh regeneration/washing frequency | 1 time/month; 1 time/2 months |
| Temperature | Ambient (Varied by nature - seasonal) |

The residence time of the waste stream through the reactor was calculated by dividing the reactor volume by the total flow rate of waste stream through the reactor (total flow rate=flow rate of peroxide+flow rate of waste stream).

During the trial period of Example 1, inlet (influent) and outlet (effluent) samples were collected on a weekly basis over a 6 month period for analysis. The parameters analysed weekly for waste stream A included: pH, organic compound levels (Chemical Oxygen Demand (COD) and Biochemical Oxygen Demand (BOD)), ammonia, sulphide, dissolved methane, suspended solids, alkalinity (calcium carbonate ($CaCO_3$)). A summary of the experimental data obtained from analysis of the influent over a period of 4 years is provided in Table 2 and shows the variation in the composition of waste stream A. A comparison of the averaged influent and averaged treated effluent data over a 6 month period is shown in Table 3. The data in Tables 2 and 3 was obtained using a 3 g/L dosage of Hydrogen Peroxide.

In addition to the above, a detailed analysis of the substances provided in lists I and II of the Groundwater Directive (80/68/EEC) was also performed every six months. A total of 181 organic compounds from the lists I and II of dangerous substances were analysed in the influent and effluent streams. The results of this analysis are shown in Table 4. Out of the 181 organic compounds, only 19 organic compounds were found in the influent waste stream A. The average concentrations of these 19 organic compounds in the influent and effluent are shown in Table 4.

The reactor used was in accordance with the present invention, and was equipped with temperature, pH sensors and data loggers. The data from the data loggers was downloaded on a monthly basis.

TABLE 2

| Description | Limit of Quantification (LOQ) | Minimum | Maximum | Mean | Standard Deviation |
|---|---|---|---|---|---|
| pH (Lab) | | 7.5 | 8.6 | 8 | 0.25 |
| Ammoniacal Nitrogen (N: mg/L) | 0.4 | 920 | 2400 | 1537.6 | 385.4 |
| Chloride, Soluble (mg/L) | 5 | 2200 | 6600 | 3914 | 985 |
| Nitrate (N; mg/L) | 0.3 | 0.3 | 20 | 2.3 | 5.01 |
| Nitrite (N: mg/L) | 0.03 | 0.03 | 4 | 0.29 | 0.65 |
| Sulphate, soluble as S (mg/L)* | 2 | 2 | 47 | 6 | 9 |
| Sulphide (mg/L) | 0.1 | 0.1 | 21 | 4.4 | 5.3 |
| Alkalinity ($CaCO_3$: mg/L) | 20 | 3700 | 8600 | 6173 | 1103 |
| BOD (mg/L) | 2 | 410 | 4100 | 2047 | 1119 |
| COD (mg/L) | 20 | 2800 | 8000 | 5060 | 1580 |
| Methane (Dissolved) (mg/L) | 0.003 | 0.78 | 8.5 | 3.788 | 1.85 |
| Suspended solids (mg/L) | 5 | 10 | 580 | 150 | 101 |

TABLE 3

| Determinant | Influent | Effluent | Removal % |
|---|---|---|---|
| pH (Lab) | 8.08 | 8.38 | |
| Ammoniacal Nitrogen (N: mg/L) | 1344 | 843 | 37.27 |
| Chloride (mg/L) | 3858 | 3425 | 11.24 |
| Sulphide (mg/L) | 6.53 | 0.22 | 96.60 |
| Alkalinity ($CaCO_3$: mg/L) | 6016 | 3807 | 36.72 |
| BOD (mg/L) | 1506 | 188 | 87.64 |
| COD (mg/L) | 5329 | 2628 | 50.68 |
| Methane (Dissolved) (mg/L) | 4.18 | 0.03 | 99.32 |
| Suspended Solids (mg/L) | 277 | 91 | 67.27 |

Table 2 and FIGS. 8 and 9 show that there is a significant variability in influent strength and Table 3 and FIGS. 8 and 9 show that the reactor described herein (exemplified with respect to BOD removal) was able to successfully cope with these changes in the influent. The pH of waste stream A was fairly constant at about 8. Waste steam A had high levels of ammonia (920-2400 mg/L), high levels of COD (2800-8000 mg/L) and only trace amounts of lead, mercury, cadmium, copper and zinc. Significant amounts of nickel (mean=2.76 mg/L), chromium (mean concentration=2.95 mg/L) and iron (5.77 mg/L) were found in waste stream A, and the level of dissolved methane in the waste stream A was also high (mean concentration=3.788 mg/L).

BOD and COD data is often used to assess the level of organic contamination in wastewater, rather than individual assessment of all contaminants the wastewater comprises. BOD and COD measurements are a measure of how much oxygen the wastewater is consuming due to organic contamination. Thus, wastewater treatment process should aim to reduce BOD and COD substances to a minimum.

In Example 1, the BOD and COD of both influent and effluent were determined so as to evaluate the effectiveness of the treatment technology towards the decomposition of organic pollutants.

The results of Example 1 show that the method and apparatus of the present disclosure remove BOD components, with an average removal of 88%. In addition to this, it was found that the performance of the reactor in removing BOD components was not affected by variations of BOD compounds in the waste stream influent (approximately 100-4000 mg/L BOD). The removal of BOD compounds from the influent can be seen in FIGS. 5 and 6.

The removal of COD compounds from the influent can be seen as a function of hydrogen peroxide dosage in FIG. 7. It was surprisingly found that increasing the dosage of hydrogen peroxide from 3 g/L to 5 g/L (67% increased dosage) results in only a 10% increase in COD compound removal.

TABLE 4

|   | Variable | Influent (μg/L) | Effluent (μg/L) | % removal |
|---|---|---|---|---|
| 1 | TPH > C8-C10 | 110 | <100 | >9 |
| 2 | TPH > C10-C16 | 670 | 210 | 69 |
| 3 | TPH > C16-C24 | 350 | 110 | 69 |
| 4 | TPH > C24-C40 | 200 | 160 | 20 |
| 5 | TPH > C6-C40 | 1400 | 510 | 64 |
| 6 | benzene | 2.2 | <1.0 | >55 |
| 7 | toluene | 10 | <2.0 | >80 |
| 8 | ethyl benzene | 5.7 | <1.0 | >82 |
| 9 | M, p-xylene | 16 | <2.0 | >88 |
| 10 | o-xylene | 5.3 | <1.0 | >81 |
| 11 | 1,3,5-trimethylbenzene | 1.5 | <1.0 | >33 |
| 12 | 1,2,4-trimethylbenzene | 7.1 | <1.0 | >86 |
| 13 | p-isoproyltoluene | 3.3 | <1.0 | >70 |
| 14 | naphthalene | 4.6 | <1.0 | >78 |
| 15 | phenol | 81 | <4.0 | >95 |
| 16 | 2-methylphenol | 6.1 | <4.0 | >34 |
| 17 | dichlorprop | 4.1 | <0.10 | >98 |
| 18 | fenthion | 1.6 | 0.29 | 82 |
| 19 | phorate | 3.7 | <0.002 | ~100 |

As shown in Table 4, the apparatus and method of the present invention are effective towards the decomposition of most of the organic compounds. These results confirm that the apparatus and method of the present invention does not introduce any dangerous organic substances from Lists I and II of the Groundwater Directive (80/68/EEC) to the waste stream A. Instead, it is effective in chemically decomposing organic pollutants.

For the three concentrations of hydrogen peroxide used, the concentration of 1 g/L was found to be the least effective for the removal of organics in waste stream A, and 5 g/L was found to be the most effective. The use of 5 g/L of hydrogen peroxide additionally resulted in a slower rate of organic matter (slime) build up on the discs.

With a hydrogen peroxide concentration of 3 g/L it was found that there was no significant decrease in performance of the reactor, but the rate of build-up of slime increased.

Summary of results for Example 1:

88% removal of BOD

51% removal of COD (at natural pH using 3 g/L peroxide)

over 96% removal of dissolved methane

97% removal of sulphides

37% ammonia removal up to 67% reduction in TSS excellent removal of organic pollutants;

the catalytic fabric used in the reactor has successfully been used to treat raw landfill leachate continuously for over 1 year without signs of deactivation;

there has been found to be an insignificant difference between influent and effluent pH, hence the catalytic system treats the leachate at its natural pH of between 7.5 and 8; and there was no significant difference in the performance of the system towards BOD reduction across the seasons (temperatures during the year varied from −1° C. to 35° C.).

Example 2—Treatment of a Waste Stream B

A waste stream B was tested using a reactor according to the present invention. One trial was conducted for a period of 2 months to determine the reactor's ability to remove endocrine disruptor chemicals (EDCs) from the waste stream, most particularly estrone (E1), 17β-estradiol (E2), and 17α-ethinylestradiol (EE2).

Influent samples were taken from waste stream B which comprised EDCs. Effluent samples were taken once waste stream B had been treated in the reactor. The reactor in Example 2 was the same as the reactor used in Example 1. The variables for the trial are shown in Table 5.

TABLE 5

|   | Trial 1 | Trial 2 |
|---|---|---|
| Initial hydrogen peroxide ($H_2O_2$) concentration | 100 mg/L | 40-100 mg/L |
| Residence time | 5 hrs | 3 hrs |
| Temperature | Ambient (Varied by nature - seasonal) | |

The influent for Trial 1 had a COD concentration of 40 mg/L and a TOC concentration of 11 mg/L. Average concentrations of EDCs in the influent were E1~11.4 ng/L, E2~0.97 ng/L, EE2~0.48 ng/L.

The influent for Trial 2 had a COD concentration of 40 mg/L and a TOC concentration of 11 mg/L. Average concentrations of EDCs in the influent were E1~56 ng/L, E2~10 ng/L, EE2~0.7 ng/L.

TABLE 6

| Chemical | Trial 1 - % removal | Trial 2 - % removal |
|---|---|---|
| aluminium | 79.0 | 91 |
| chromium | -2.2 | |
| copper | 53.8 | 84 |
| iron | 81.4 | 90 |
| soluble iron | -12.2 | 33 |
| lead | 57.3 | 87 |
| manganese | 88.9 | 78 |
| nickel | 22.7 | 54 |
| zinc | 3.5 | |
| pH | 7.24 increased to 7.8 | |
| alkalinity | 22.2 | 20 |
| colour | 8.0 | 3 |
| ammonia | 18.7 | 76 |
| chloride | -4.2 | |
| nitrate | -8.1 | |
| othophosphates | 35.5 | 29 |
| sulphates | -6.9 | |
| TSS | 87.0 | 92 |
| TOC | -54.1 | 18 |
| atrazine | 3.4 | 19 |
| simazine | -3.6 | 22 |
| terbutryn | 33.5 | 37 |
| E1 | 82.7 | 73 |
| E2 | 86.4 | 87 |
| EE2 | 67.7 | 17 |
| aspirin | 27.9 | 18 |
| ibuprofen | -11.4 | 20 |
| triclosan | 30.1 | 42 |
| carbamazepine | 11.0 | 0 |

Example 3—Treatment of a Waste Stream C Using Microwave Treatment

Experiments have been carried out to determine the effectiveness of microwaves in the method according to the present invention, by comparing the results of waste stream treatment using microwaves with the results obtained using similar process conditions but without the presence of microwaves.

(1) Microwave Assisted Catalysis Experiment—

Microwave assisted catalysis of carbetamide and chlorotoluron was performed in a laboratory using a CEM Mars 6 microwave reactor as a microwave source.

A 100 ml round bottomed flask was used as a reaction vessel. The initial concentration of carbetamide in the reaction mixture was 20 mg/L. 4 g of fibrous modified PAN catalyst comprising iron (III) cations was used, and the reaction mixture was dosed with 300 ppm hydrogen peroxide. The pH of the mixture was 4.6. Temperature was not controlled and was monitored using a fibre optic temperature sensor.

A magnetic stirring device was used within the reaction vessel to ensure good mixing. Once the reaction mixture was prepared the reaction vessel was placed inside a microwave cavity supplied with continuous wave 80 W microwave power.

The percentage of carbetamide and reaction temperature was monitored on an online basis within the reactor.

This experiment was then repeated using chlorotoluron instead of carbetamide.

(2) Non-Microwave Catalysis Experiment—

The experimental technique described above for the microwave catalysis experiment with carbetamide and chlorotoluron was repeated again, but without subjecting the reaction mixture to microwaves in the microwave reactor and with a few other minor changes.

The results for the experiment described above for the microwave catalysis showed a steady increase in temperature throughout the reaction time. This temperature increase is attributed to the heating effect of the microwaves on the reaction mixture. To simulate the same temperature increase for the non-microwave catalysis experiment, for this second experiment a conventional reaction station comprising a heated base plate was used to provide the reaction mixture with the same temperature profile of the microwave assisted catalysis reaction. The results from experiment (1) and (2) are shown in FIGS. 8 and 9, which show the results for experiments with carbetamide and chlorotoluron respectively.

FIG. 8 shows that the microwave assisted catalysis exhibited a 32% improvement in carbetamide removal compared to without microwave assistance. Microwave assisted provides a 2.6 fold improvement when compared to non-microwave assisted catalysis reaction without the temperature control.

FIG. 9 shows that after 15 minutes 60% of the chlorotoluron was removed from the reaction mixture. In comparison, after 15 minutes without microwave assistance, 43% of the chlorotoluron was removed. Therefore, the microwave assisted catalysis exhibited around a 40% improvement in chlorotoluron removal compared to without microwave assistance but at the same temperature. Only 25% chlorotoluron was removed after 15 minutes without microwave assistance and without the temperature being controlled to mirror the temperature of the microwave assisted experiment.

Example 4—Treatment of a Waste Stream D Using an Ion Exchange Material on the Reactor Contactors A waste stream D was treated using a reactor according to the present invention in a continuous flow process for a period of 6 months. The reactor used had a volume of 60 L, and comprised 30 contactor discs covered with the modified PAN ion exchange material. The rotation speed of the discs was 10 revolutions per minute (60 degrees per second) and the residence time was 2 hours. There was no pre-treatment of waste stream D. During the trial, influent and effluent samples were collected daily for analysis. Regeneration of the ion exchange materials was successfully performed after 8 weeks of continuous operation using a solution of 5% HCl.

TABLE 7

| Parameters | Influent (mg/L) | | | Effluent (mg/L) | | | Removal (%) |
|---|---|---|---|---|---|---|---|
| | Maximum | Minimum | Average | Maximum | Minimum | Average | |
| pH (not mg/L) | 7.2 | 6.6 | 6.87 | 7.7 | 7 | 7.4 | N/A |
| Suspended Solids | 193 | 5 | 67 | 35 | 5 | 9 | 87.16 |
| Alkalinity total | 190 | 141 | 174 | 162 | 78 | 112 | 35.59 |
| Acidity total | 28.1 | 0 | 5.8 | 0 | 0 | 0 | 100 |
| Ba total | 0.13 | 0.04 | 0.07 | 0.06 | 0.04 | 0.04 | 35.29 |
| Ba dissolved | 0.06 | 0.04 | 0.05 | 0.05 | 0.03 | 0.04 | 13.56 |
| Ni total | 0.081 | 0.064 | 0.073 | 0.059 | 0.037 | 0.052 | 28.83 |
| Ni dissolved | 0.081 | 0.066 | 0.074 | 0.062 | 0.034 | 0.051 | 30.84 |
| Cr total | 0.002 | 0.001 | 0.001 | 0.001 | 0.001 | 0.001 | 9.09 |
| Cr dissolved | 0.005 | 0.001 | 0.001 | 0.005 | 0.001 | 0.001 | 0.00 |
| Cd total | 0.486 | 0.257 | 0.342 | 0.309 | 0.16 | 0.241 | 29.52 |
| Cd dissolved | 0.471 | 0.19 | 0.291 | 0.308 | 0.15 | 0.224 | 23.02 |
| Cu total | 0.019 | 0.001 | 0.008 | 0.004 | 0.001 | 0.002 | 74.67 |
| Cu dissolved | 0.01 | 0.001 | 0.004 | 0.01 | 0.001 | 0.003 | 30.23 |
| Pb total | 0.611 | 0.01 | 0.203 | 0.029 | 0.001 | 0.005 | 97.53 |
| Pb dissolved | 0.17 | 0.011 | 0.04 | 0.01 | 0.001 | 0.002 | 95.24 |
| Zn total | 84.62 | 57.87 | 68.557 | 28.65 | 7.804 | 19.33 | 71.8 |
| Zn dissolved | 72.78 | 52.59 | 62.948 | 28.66 | 7.64 | 16.621 | 73.6 |
| Mn total | 0.64 | 0.34 | 0.425 | 0.24 | 0.1 | 0.18 | 57.65 |
| Mn dissolved | 0.42 | 0.3 | 0.368 | 0.26 | 0.1 | 0.181 | 50.82 |
| Fe total | 12.2 | 0.33 | 2.543 | 2.54 | 0.17 | 0.418 | 83.55 |
| Fe dissolved | 0.7 | 0.17 | 0.326 | 0.25 | 0.16 | 0.198 | 39.13 |
| As total | 0.003 | 0.001 | 0.002 | 0.001 | 0.001 | 0.001 | 37.5 |
| As dissolved | 0.001 | 0.001 | 0.001 | 0.001 | 0.001 | 0.001 | 0.00 |

TABLE 7-continued

|  | Influent (mg/L) | | | Effluent (mg/L) | | | |
| --- | --- | --- | --- | --- | --- | --- | --- |
| Parameters | Maximum | Minimum | Average | Maximum | Minimum | Average | Removal (%) |
| B total | 0.06 | 0.02 | 0.046 | 0.06 | 0.03 | 0.045 | 2.17 |
| Al total | 1.17 | 0.05 | 0.348 | 0.48 | 0.02 | 0.078 | 77.75 |
| Al dissolved | 0.09 | 0.01 | 0.028 | 0.07 | 0.01 | 0.027 | 3.57 |
| Si dissolved | 4.4 | 3.4 | 3.925 | 4.2 | 2.6 | 3.683 | 6.16 |

As shown in Table 7, the reactor system of Example 4 was found to be effective in removing metals from waste stream D. In particular, the system was able to remove over 70% of zinc from waste stream D which was heavily contaminated with zinc (influent averaged 60 mg/L). The system was also effective in removing acidity (100%), suspended solids (87.13%) and alkalinity (35.59%). Table 8 below summarises some aspects of the treatment of waste stream D, before and after regeneration of the ion exchange materials.

TABLE 8

| Parameters | Overall | Before Regeneration | After Regeneration |
| --- | --- | --- | --- |
| Treatment duration (days) | 170 | 79 | 91 |
| Average flow rate (L/hr) | 32.22 | 28.18 | 35.60 |
| Volume of treated mine water (m³) | 131.46 | 53.43 | 77.75 |
| Average influent/effluent Zn concentration (ppm) | 49.14/17.23 | 53.43/15.51 | 45.36/18.73 |
| Average Zn removal efficiency (%) | 64.18 | 70.40 | 58.78 |
| Amount of Zn exposed/removed (kg) | 6.46/4.15 | 2.85/2.01 | 3.53/2.07 |
| Average influent/effluent Cd concentration (ppb) | 188.8/146.2 | 248.5/192.3 | 137.1/106.2 |
| Average Cd removal efficiency (%) | 22.37 | 21.54 | 23.08 |
| Amount of Cd exposed/removed (g) | 24.82/5.55 | 13.28/2.86 | 10.66/2.46 |
| Average influent/effluent Pb concentration (ppb) | 53.00/14.00 | 42.30/8.70 | 62.00/18.50 |
| Average Pb removal efficiency (%) | 75.04 | 77.73 | 72.75 |
| Amount of Pb exposed/removed (g) | 6.95/5.22 | 2.26/1.76 | 4.82/3.51 |

Accordingly, 4.15 kg of Zn, 5.55 g of Cd and 5.22 g of Pb were removed from 131.46 m³ of waste stream D.

Example 5—Treatment of a Sample of a Waste Stream E Using Ultraviolet Treatment

Experiments have been carried out to determine the effectiveness of ultraviolet energy in waste stream treatment. The experiments of Example 5 were carried out on a laboratory scale to simulate the equipment and conditions of a reactor employing ultraviolet treatment in accordance with the present invention. Examples 7, 8 and 12 set out below relate to the use of ultraviolet treatment in a reactor in accordance with the present invention.

A waste stream sample comprising water and acetaminophen (paracetamol) was treated with and without ultraviolet treatment: (1) in the presence of hydrogen peroxide and a modified PAN fibrous catalyst comprising iron (III) cations, (2) in the presence of hydrogen peroxide only, and (3) in the presence of a modified PAN fibrous catalyst comprising iron (III) cations only.

The waste stream sample was prepared in a reaction vessel (a quartz conical flask) using double distilled water and paracetamol (from Fischer Scientific). Paracetamol was present in 20 ppm. If hydrogen peroxide was used, it was present in an amount of 100 ppm or 50 ppm. 3 grams of modified PAN fibrous catalyst was added for experiments requiring the catalyst. A water jacket was used with the reaction vessel to maintain the contents of the reaction vessel at a temperature of around 20° C. The solution prepared was pH 7. For experiments requiring ultraviolet treatment, four ultraviolet lamps with a peak wavelength of 253.7 nm and 8 W power were placed around the jacketed reaction vessel.

The results of Example 5 without ultraviolet treatment for scenarios (1), (2) and (3) are shown in FIG. 10. FIG. 11 shows the results of Example 5 with ultraviolet treatment for scenarios (1), (2) and (3). FIG. 12 shows a direct comparison of the degradation of paracetamol with and without ultraviolet treatment, with a 50 ppm concentration of hydrogen peroxide, 3 g of a modified PAN fibrous catalyst and 20 ppm initial concentration of paracetamol.

FIGS. 10 and 11 show the degradation of the paracetamol both with and without ultraviolet treatment. FIGS. 10 and 11 show there is little sorption of paracetamol when only the catalyst is present and that UV light alone does not degrade the paracetamol. From the data shown in FIG. 10 it has been found that hydrogen peroxide alone does not degrade paracetamol substantially. The data in FIG. 11 shows that 90% degradation of paracetamol is achieved in 160 minutes with ultraviolet treatment and hydrogen peroxide, and when the catalyst is incorporated it takes only 90 minutes to achieve the same level of degradation.

FIG. 12 shows that 90% removal of paracetamol was achieved in 80 minutes in the presence of ultraviolet energy, whereas it took over 180 minutes without ultraviolet treatment. FIG. 12 shows that 50 ppm of hydrogen peroxide was sufficient to achieve the same 90% degradation of paracetamol that was achieved when 100 ppm of hydrogen peroxide was used (shown in FIGS. 10 and 11).

Example 6—Treatment of a Sample of a Waste Stream F Using Ultraviolet Treatment

Experiments have been carried out to determine the effectiveness of ultraviolet energy in waste stream treatment.

A waste stream sample (waste stream F) comprising water and clotrimazole was treated (1) in the presence of hydrogen peroxide and a modified PAN fibrous catalyst comprising iron (III) cations with and without ultraviolet treatment, and (2) with ultraviolet treatment, with and without hydrogen peroxide but with no catalyst present.

The waste stream sample was treated in an open dish reactor with pieces of free catalyst free floating in the dish. Low power UVc lamps were positioned above the dish reactor to expose the contents of the dish reactor to UV energy. 10 g of catalyst and 50 mg/L of $H_2O_2$ were used in a reaction volume of 200 mL. The reaction was kept at pH 3 while temperature was maintained at 25° C. using a circulator. The maximum UV irradiance of 2.2 mW/cm² was achieved using a total of 32 watts from low pressure UVc lamps from above the reactor, irradiated over a distance of 5 cm. This experiment simulates a scenario where ultraviolet energy is introduced into the headspace of a reactor in accordance with the present invention.

A 10 mg/L clotrimazole solution was prepared from an initial 5 g/L solution made in acetonitrile by diluting 300 µL in double distilled water (temperature of solution was maintained to between from 23 and 25° C. to forestall precipitation). HPLC analysis of clotrimazole was performed using a C-18 reverse phase column (250 mm×4.6 mm) with 5 micron packing. Mobile phase combination was 70:30 Acetonitrile:water (V/V).

The results of Example 6 are shown in FIG. 14 and Table 9 with and without ultraviolet treatment, hydrogen peroxide and catalyst.

TABLE 9

| Priority List | Time taken for 50% degradation (mins) | | | | Time taken for 90% degradation (mins) | | | |
| --- | --- | --- | --- | --- | --- | --- | --- | --- |
| Compound | UV | UV/H$_2$O$_2$ | CAT | UV/CAT | UV | UV/H$_2$O$_2$ | CAT | UV/CAT |
| Temperature | 25° C. | 25° C. | 25° C. | 25° C. | 25° C. | 25° C. | 25° C. | 25° C. |
| Dish reactor | 40.0 | 9.0 | 8.3 | 3.0 | >120 | 44.0 | 28.0 | 8.3 |

In Table 9, UV refers to ultraviolet treatment alone, UV/H$_2$O$_2$ to ultraviolet treatment coupled with hydrogen peroxide (no catalyst present), CAT refers to a Fenton catalysis system comprising catalyst and hydrogen peroxide, UV/CAT to the UV-assisted Fenton catalysis system.

The data of FIG. 14 and Table 9 shows an enhancement in the rate of removal of clotrimazole when using UV alone, and that a clear synergistic effect in removal of clotrimazole is obtained through use of the UV/H$_2$O$_2$ system and particularly the UV/CAT system.

Example 7—Treatment of a Sample of a Waste Stream G Using Ultraviolet and Microwave Treatment Experiments have been carried out to determine the effectiveness of ultraviolet and microwave energy in waste stream treatment. Waste stream G comprised water and clotrimazole, and was treated in the presence of hydrogen peroxide and a modified PAN fibrous catalyst comprising iron (III) cations: (1) with and without ultraviolet treatment, (2) with and without microwaves and (3) with both UV and microwave treatment.

Waste stream G was treated in a rotating disc reactor in accordance with the present invention operating in a batch-type mode. The reactor was placed inside a CEM Mars 6 microwave oven. The plastic sheet in the door of the microwave oven was removed and 8 low power 8 Watt UVc lamps were attached to the outside of the door, such that the UV light went through the closely spaced metal grill in the door of the microwave oven into the cavity of the microwave oven housing the rotating disc reactor.

The reactor had 8 rotating discs of 10 cm diameter, each disc being covered with a catalytic mesh comprising a modified PAN fibrous catalyst. The reaction volume was 1.2 L and comprised 50 mg/L of hydrogen peroxide and 10 mg/L clotrimazole solution. 10 mg/L clotrimazole solution was prepared from an initial 5 g/L solution made in acetonitrile by diluting 300 µL in double distilled water (temperature of solution was maintained between from 23 to 25° C. to forestall precipitation). The reaction was kept at pH 3 and the UV flux density on the discs was 0.57 mW/cm² in the center of the reactor (measured with an ILT 1400 Radiometer with UV detector). Samples from within the reactor were taken every 2 minutes. These samples were analysed to determine the level of clotrimazole degradation using HPLC analysis. The microwave program was as follows: 100 watt power, set on a constant temperature of 35° C., for 30 minutes.

A difficulty with the experimental procedure for Example 7 outlined above was that every time the door of the microwave oven was opened to take a sample, power to the UVc lamps and microwave oven was turned off. Thus, every sampling point had a down time of 60 seconds which was found to have a significant effect on results obtained when samples were taken every 2 minutes.

The HPLC analysis of clotrimazole and carbetamide was performed as a function of time using a C-18 reverse phase column (250 mm×4.6 mm) with 5 micron packing. Mobile phase combination was 70:30 Acetonitrile:water (V/V). Standard stock solution was prepared in acetonitrile (5 g/L) for clotrimazole.

The results of Example 7 are shown in FIG. 15 and Table 10 with and without ultraviolet and with and without microwave treatment in addition to the catalytic reaction.

TABLE 10

| | Time taken for 50% degradation (mins) | | | | Time taken for 90% degradation (mins) | | | |
| --- | --- | --- | --- | --- | --- | --- | --- | --- |
| | CAT | UV/CAT | MW/CAT | UV/MW/CAT | CAT | UV/CAT | MW/CAT | UV/MW/CAT |
| Temperature | ~25° C. | ~25° C. | 35° C. | 35° C. | ~25° C. | ~25° C. | 35° C. | 35° C. |
| Rotating reactor | 10.50 | 1.90 | 4.80 | 1.05 | >30.00 | 13.40 | 13.45 | 3.25 |

Where CAT refers to the Fenton catalysis system as described above, UV/CAT to the UV-assisted Fenton catalysis system, MW/CAT to the microwave assisted Fenton catalysis system and UV/MW/CAT to the UV and microwave assisted Fenton catalysis system.

The data of FIG. 15 and Table 10 show that there is an enhancement in the rate of removal of clotrimazole by assisting the catalytic reaction with UV and microwave energy, but that the most significant enhancement is the coupling of both UV and microwave energy together to the catalytic reaction (a 10-fold enhancement).

Example 8—Treatment of a Sample of a Waste Stream H Using Ultraviolet and Microwave Treatment The experiments carried out for Example 8 were similar to those carried out for Example 7 above, however Example 8 differs in that the solution of clotrimazole was replaced by a solution of 10 mg/L of carbetamide made up in distilled water using a commercial granular formulation of the pesticide "Crawler®" which contains 600 g per kg of carbetamide.

The results of Example 8 are shown in FIG. 16 and Table 11. Samples were taken every 2 minutes are designated in FIG. 16 as "with disturbance every 2 mins". Separate samples were also taken every 10 minutes (marked as "no disturbance or not disturbed for 10 mins") so as to overcome the sampling difficulty discussed above in relation to Example 7.

located in the control cabinet and a remote head located on the oven section. The remote heads were fitted with a microwave circulator and dummy load for protection. A manual 3 stub tuner was fitted after the circulator to optimise the forward power into the target and minimise the reflected power. Magnetrons were protected by arc detectors in the launch waveguide which is also air purged to protect from condensation and purge. Internal of control cabinet, each generator unit power supply has a local self-diagnostic control panel and fuse panel. The reactor further comprised a chiller unit for cooling the magnetrons.

Launch waveguide comprised of 3 microwave entries WG 9A Br/wr345 Amer, motorised mode stirrer, and air ventilation. A microwave choke was used to isolate the vessel from the water tank and a separate control cabinet was provided containing the control panel, control relays, contactors and fusing. The temperature at the surface of the discs was measured using a pair of infrared pyrometers, which enabled control of the process temperature. The control system enabled the variation of power to the magnetron so as to maintain a constant temperature in the reactor. pH sensors were installed at the inlet and outlet of the reactor.

TABLE 11

| | Time taken for 50% degradation (mins) | | | | Time taken for 90% degradation (mins) | | | |
|---|---|---|---|---|---|---|---|---|
| | CAT | UV/CAT | MW/CAT | UV/MW/CAT[a] | CAT | UV/CAT | MW/CAT | UV/MW/CAT[a] |
| Temperature | 18° C. | 18° C. | 35° C. | 35° C. | 18° C. | 18° C. | 35° C. | 35° C. |
| Rotating reactor | 26.00 | 15.80 | 8.50 | 2.20 | 79.00 | 60.00 | 22.00 | 5.00 |

Definitions of CAT, UV/CAT, MW/CAT and UV/MW/CAT are given above in Example 7. (a)=Data taken from UV+MW+Fenton with no disturbance as shown in FIG. 16.

The data of FIG. 16 and Table 11 show an enhancement in the rate of removal of carbetamide by assisting the catalytic reaction with UV and microwave energy, but that the most significant enhancement in removal of carbetamide was found by coupling both ultraviolet and microwave treatment together with the catalytic reaction (more than a 10-fold enhancement). The data also shows that coupling microwave energy to the catalyst is not dependent on whether the sampling time is every 2 minutes or every 10 minutes. It is thought that this is because the primary effect of the microwaves is to provide thermal energy and there is negligent drop in temperature whilst the door is opened over the 60 second sampling time.

The following Examples 9-11 have been carried out to determine the effectiveness of waste stream treatment of a reactor in accordance with the present invention operating on a continuous flow basis and employing microwave treatment.

The reactor used in Examples 9 to 11 was in accordance with the present invention and was a stainless steel microwave reactor comprising an inner tank of length 850 cm, width 610 cm, and had an effective volume of 80 L. There were 16 discs in the reactor tank with each disc of diameter 51.5 cm each of which was covered with a catalytic mesh. The fabric of the catalytic mesh comprised iron (III) cations containing modified polyacrylonitrile yarn and 3% carbon black. The reactor also comprised: a variable speed motor and shaft system for rotating the catalytic discs in the reactor at 10 rpm, an internal microwave choke fitted to isolate the microwave section from water tank, three 2 kW microwave generator units (GU020) with high voltage power supply The stainless steel reactor tank and discs were housed in a stainless steel container of dimensions 1008.4 m length× 611.5 m width×971.0 m height, which was fitted with a view port and illumination and a microwave roof launch. The container was supported by a stainless steel frame. The microwaves were fed into the top of the reactor via 3 ports on the top of the reactor housing with each port connected to a rectangular waveguide leading back to a 2 kW magnetron in the control panel. The distance that the microwaves travelled from the magnetrons to the reactor was a total of 3400 cm.

Hydrogen peroxide dosing into the reactor was via two ports one into each compartment of the reactor. The hydrogen peroxide was delivered into the wastewater in the reactor tank which is shielded from the microwaves by the metal plate.

The reactor, the control panel with magnetrons and waveguides, and the inlet and outlet tanks were housed in a 20 ft ISO container. The pump station has a water level sensor to help indicate when refilling is required. A refrigerator was also used in the container for temporal storage of samples. The reactor was electrically wired to take a 3 phase power supply 400 V, 32 amp, neutral and earthed connection to power the reactor, lamps and other electrical equipment in the container. The container had two ventilation ports and also fan heater above the microwave generators prevent any condensation onto the electrical components from warm wastewater from the reactor.

Other equipment in the ISO container included: heat exchanger to recover the heat energy from the treated water, dosing pumps for feed and hydrogen peroxide, dosing station for pumping away treated water, inline temperature and pH sensors and data loggers for measuring the temperature and pH before treatment and after treatment pre-heat exchanger and after treatment post-heat exchanger, a peroxide tank for holding dilute peroxide solution for pumping into the reactor. Hydrogen peroxide (35% w/w) was be kept in an appropriate container in a bund. A 2 m long dispenser was used to dispense hydrogen peroxide for further dilution.

Example 9—Treatment of a Waste Stream H Using Microwave Treatment

In Example 9, a wastewater feed (waste stream H) comprising 10 mg/L carbetamide was made up in distilled water using a commercial granular formulation of the pesticide "Crawler" which contained 600 g per kg of carbetamide and dosed into the reactor such that the residence time in the reactor was 6 hours. Hydrogen peroxide was dosed into the reactor to achieve a concentration of 500 mg/L in the tank. The diluted hydrogen peroxide in the peroxide holding tank was dosed with an appropriate amount of concentrated HCl (35% w/v) to achieve a pH of 3 in the reactor tank. The microwave power was set to a temperature of 30° C. and the reactor ran for 5 days continuously achieving greater than 95% degradation in carbetamide. On the 6th day the microwave power was turned off and the temperature in the reactor tank stabilised at 9° C. resulting in only a 25% degradation of carbetamide.

Example 10—Treatment of a Waste Stream H Using Microwave Treatment

Example 10 was carried out to test the effectiveness of the reactor in the treatment of the wash down water from the sprayers containing pesticides. 5 m³ holding tank was filled with dilute glyphosphate (weed killer).

The glyphosphate was then dosed with 10 mg/L of each of the following commercial pesticides: Vivendi® 200 (200 g/L clopyralid), Edge 400 (400 g/L propyzamide), Duplosan® KV (600 g/L mecoprop), Reldan® 22 (225 g/L chlorpyrifos), Proline® 275 (27 g/L prothioconaole), Pastor® Pro (50 g/L clopyralid, 75 g/L fluroxypyr and 100 g/L trychlopyr), Cyper 100 (100 g/L cypermethrin), Centaur® (200 g/L cyproconazone), Staff 500 (500 mg/L 2,4-D as the dimethyl ester), Samson® extra (60 g/L nicosulfuron), Regatta® (400 g/L flufenacet and 100 g/L diflufenican), Stunt (250 g/L trinexapac-ethyl), Rubric® (125 g/L epoxiconazole), Alto Elite® (40 g/L cyproconazole and 375 g/L chlorothalonil), Lingo® (45 g/L clomazone and 250 g/L linuron), Bromotril® P (240 g/L bromothril)

The microwave generators were set to a temperature of 30° C. on the discs and the disc rotational speed was set at 10 rpm. The flow of wastewater into the reactor was set at 150 mL/min and the hydrogen peroxide flow rate was 3.8 mL/min to give a final peroxide concentration in the reactor tank of 500 mg/L. Samples of wastewater were collected from the inlet just before it goes into the reactor and from the outlet twice weekly and sent to a UKCAS accredited laboratory for analysis. The samples were analysed for alkalinity, pH, ammoniacal nitrogen, BOD, COD, TSS, nitrate, total nitrogen, phosphate, phosphorus and a range of metals including iron. The samples were also analysed for the presence of urons and triazines, acid herbicides and organochlorine pesticides. Similarly, samples were collected twice a week for Chemical Oxygen Demand (COD) analysis (using standard procedure for COD analysis from Hach®).

Inlet pH averaged about 7.7 and the inlet stream temperature was ~12-13° C., whilst the outlet temperature before the heat exchanger was 27° C. in the bulk wastewater in the tank. The heat exchanger recovered 15° C. to be used to preheat the inlet and save microwave power.

The outlet pH was initially 4.5 but after 3 days rose to a pH of between 7.5 and 8.5. The outlet temperature after the heat exchanger was on average 15° C. Thus microwave power was seen to reduce once this steady state was achieved.

The inlet COD ranged from 40-160 mg/L and outlet ranged from 20-80 mg/L with a consistent removal rate of 60% reduction in COD in the treated wastewater which was independent of pH over a tested range of pH 4.5-7.7.

The inlet Total Suspended Solid (TSS) content varied from between 4 mg/L to 25 mg/L, and TTS measurements at the outlet of the reactor ranged from 2-4 mg/L independent of inlet TSS concentration. Samples were seen to be much clearer coming out of the reactor.

Total Phosphorus inlet values were high initially at 5000 mg/L, which was fully removed while the hydrogen peroxide dosing was at 500 ppm and the pH was 4.5. As the pH rose to between 7.5 and 8.5 after the first 3 days, the extent of the removal decreased to 17% removal. It is believed that the decrease in phosphorous removal is because of the high initial phosphorous loading, which led to the sites for phosphorus complexation becoming saturated.

Manganese concentration at the inlet was approximately 40 mg/L and analysis of the outlet stream found total manganese removal. Total manganese removal was achieved even when inlet values of manganese rose to 140 mg/L. Iron inlet values were on average 0.02 mg/L, and rose to between 0.225 mg/L and 0.25 mg/L towards the end of the trial. The outlet values were initially raised to 0.3 mg/L and began to drop down towards 0.02 mg/L as the loose iron present arising from incomplete catalyst washing during manufacture was washed off the catalyst. Towards the end of the trial when iron inlet values had increased to between 0.225 mg/L and 0.25 mg/L then the removal was between 45 and 80%.

Example 11—Treatment of a Waste Stream I Using Microwave Treatment

The experiments carried out in Example 11 tests the effectiveness of the reactor's ability to decompose vegetable wash water. A wastewater feed comprising wastewater from washing vegetables with COD varying from 975 to 1610 mg/L was passed through two consecutive clarifiers and then pumped using a dosing pump (10-120 L/hr) into the reactor. The residence time in the reactor was 8 hrs (but did vary up to 15 hours depending on the volume of the feed) and initial peroxide concentration was 1 g/L. The temperature was set at 30° C. Samples were collected twice weekly and the COD was analysed at a UKAS accredited laboratory.

During the trial, the initial pH of the wastewater at the inlet was between from 6.7 and the pH at the outlet was 4.7 after having passed through the reactor. These inlet and outlet pH readings were maintained over the first 5 days of the trial. After the first 5 days of the trial, the pH was acid dosed as described in Example 9 to achieve a pH of 3 in the reactor tank, which was maintained for a further 10 days. It was found that only about 14-20% of COD was removed when the initial pH was 4.7. The COD removal increased to 45-50% when the pH of the treatment process was lowered to 3

Example 12—Treatment of a Sample of a Waste Stream J Using Ultraviolet Treatment Example 12 has been carried out to determine the effectiveness of a laboratory scale rotating disc reactor in accordance with the present invention operating on a continuous flow basis and employing ultraviolet to the waste stream.

Waste stream J was produced artificially to simulate effluent water from oil mining. The chemical composition of this waste stream entering into the reactor is given in Table 12.

TABLE 12

| Compound/Parameter | Usual range (ppm) | Concentrations adopted (ppm) |
|---|---|---|
| pH | 4.3-10 | 3 |
| Oil in water mg/L | 6.9-700 | 30 (as a mixture of hexadecane, tridecane and BTEX) |
| Alkyl Phenols mg/L | 0.04-25 | 25 (as 3,5-dimethylphenol (DMP)) |
| COD mg/L | 48-1220 | 650 |
| Bicarbonates mg/L | 150-2000 | 200 (as sodium salt) |
| Chlorides mg/L | 80-200000 | 2000 (as sodium salt) |
| Total Fatty Acids mg/L | 2-4900 | 500 (as acetic acid) |

Waste stream J was treated in the presence of hydrogen peroxide and a modified PAN fibrous catalyst comprising iron (Ill) cations with and without ultraviolet treatment.

The rotating disc reactor used for Example 12 is the same as the reactor described in Example 7 with a reaction volume of 950 mL and with the discs set to rotate at 46 rpm. The 8 rotating discs were covered with catalyst mesh comprising a modified PAN fibrous catalyst, and hydrogen peroxide was dosed continuously to give a resultant concentration of 1000 mg/L in the reactor tank. The overall flow rate was 3.3 mL/min.

The dimethylphenol and hydrogen peroxide concentrations were measured by HPLC analysis with detection at 210 nm, a mobile phase of acetonitrile and water 40:60 v/v and a stationary phase Grace™ RP HPLC column with an inside diameter of 4.6 mm, a length of 250 mm, and 5 micron internal packing material. For COD analysis, a Hach® Lange DR 3800 spectrophotometer was used with Hach® COD cuvette test vials suitable for high chloride load in the range 100-2000 mg/L. The contribution of residual hydrogen peroxide to COD was found by a separate calibration and subtracted from the COD results.

Oil-in-water analysis was monitored by Fourier Transfer Infrared Spectroscopy (using a Bruker Alpha Platinum ATR device) with a 10 mm type 1 silica grade cuvette. The following peaks were used: C—H at 3030 $cm^{-1}$, methylene $CH_2$—H at 2960 $cm^{-1}$ and methyl $CH_2$—H at 2930 $cm^{-1}$ to quantify the oils using the triple peak method, modified from the IP 426/98 method for the analysis of oil-in-water (in accordance with "Department of Energy and Climate Change 2014; Yang 2011"); The calibration was performed using 5 to 90 mg/l of isooctane and n-hexadecane made up in tetrachloroethylene.

FIG. 18 shows the degradation of 3,5-dimethylphenol (DMP) over 5 distinct regimes:
A—No treatment other than rotating discs for 48 hours;
B—UV alone and rotating discs for 4 days;
C—UV/$H_2O_2$ and rotating discs for 4 days; and
D—UV/catalysis with catalytic mesh on rotating discs.
E—catalysis at 35° C. for 12 days using a heat exchanger to raise the temperature within the reactor tank.

Regimes A, B, C and D were performed at 22° C. The heat exchanger of regime E was copper tubing in the reactor tank attached to a conventional water circulator set at 35° C. Elevation of temperature of the feed solution in the tank of the reactor could be achieved by conventional heating such as the heat exchanger described above or by using microwaves in accordance with the present invention.

The results show that Regime A using rotating discs with no other form treatment reduced DMP by 18%, Regime B with UV treatment alone reduced DMP by 37%, Regime C with UV and $H_2O_2$ treatment reduced DMP by 40%, Regime D with UV and catalysis treatment reduced DMP by 83-97% and Regime E with catalysis at elevated temperature of 35° C. reduced DMP by 97%.

Results achieved for the reduction of oil in water followed a similar trend to that for 3,5-dimethylphenol.

At the end of Regime E, the catalytic mesh on the discs was treated with tetrachloroethylene to desorb any DMP or oil in water adsorbed to the mesh and analysed as described above. It was found that negligible amounts of DMP and oils in water remained untreated on the catalytic mesh, with 4.05 mg of DMP and 0.45 mg of oils in water remaining on the mesh. The total amount of DMP that passed into the reactor in the influent during a period of 448 hours=>2217 mg, whilst the total amount of oils in water that entered into the reactor for treatment during the same period was =>2000 mg.

Example 13—Treatment of a Sample of a Waste Stream K Using Ultraviolet Treatment Example 13 was carried out to determine disinfection effectiveness of a laboratory scale batch reactor employing ultraviolet energy treatment to a waste stream.

The waste stream comprises a suspension of E. coli and all tests were performed independently at least three times and followed the standard BS EN 1276 suspension test method under clean conditions.

The total reaction volume was 37.5 ml in a 200 mL beaker acting as a batch reactor, with a magnetic stirrer. 3.75 ml of E. coli suspension and 3.75 mL of Bovine Serum Albumin (BSA) were added to the beaker and made up to 37.5 mL with sterile distilled water. 3 g of modified PAN catalyst comprising iron (II) cations were used in the disinfection reaction together with hydrogen peroxide at a final concentration of 3% w/w. The beaker was then placed in the photolysis unit as described in Example 6 with a total of 24 watts from low pressure UVc lamps at a temperature of 22° C.

Neutralisation of the above was carried out using 15 mg/100 mL solution of catalase in phosphate buffer. 1 mL aliquots of the neutralised solutions were then diluted by a factor of 1000 and 100 µL aliquots were plated onto an easySprialpro® spiral plater (supplied by Interscience) on Sabouraud agar plates and were incubated for 48 hours at 37° C. After incubation, the viable counts and log reductions were calculated.

In accordance with the test procedures the initial viable counts of E. coli in suspension were between from $1.5 \times 10^8$ cfu/ml to $5 \times 10^8$ cfu/ml.

Table 13 gives the log reductions of E. coli and standard deviations (SD) on disinfection with (1) hydrogen peroxide alone, (2) modified PAN catalyst comprising iron (II) cations and hydrogen peroxide and (3) modified PAN catalyst comprising iron (II) cations and hydrogen peroxide together with UV energy.

TABLE 13

Log$_{10}$ reductions in E. coli as a function of time

| | H$_2$O$_2$ alone | SD | Cat/ H$_2$O$_2$ | SD | UV/Cat/ H$_2$O$_2$ | SD |
|---|---|---|---|---|---|---|
| E. coli 30 s | 1.28 | 0.16 | 1.49 | 0.26 | 2.94 | 0.46 |
| E. coli 3 min | 1.81 | 0.59 | 2.48 | 0.25 | 5.77 | 0.09 |
| E. coli 5 min | 5.19 | 0.31 | 5.77 | 0.09 | 5.77 | 0.09 |
| E. coli 10 min | 5.77 | 0.09 | 5.77 | 0.09 | 5.77 | 0.09 |
| Control A | 0.36 | 0.09 | | | | |
| Control B | 0.34 | 0.05 | | | | |
| Control C | 0.38 | 0.04 | | | | |

Control A, B and C comprises 0.3 g/L BSA and sterile distilled water. Control A assesses the absence of any lethal effect in the test conditions. Control B assesses the toxicity of the neutralise to the organisms. Control C assesses the dilution-neutralization validation and ensures that the experimental conditions are not having a detrimental effect on the organisms. The methodology for the controls A, B and C is given in the standard BS EN 1276 suspension test method under clean conditions.

The data of Table 13 shows that there are negligible bactericidal effects exhibited by the controls. Table 13 also shows that a log reduction of 5.77 is achieved in 3 mins when UV is combined with the catalyst and hydrogen peroxide, whereas catalyst and hydrogen peroxide achieves a log reduction of only 2.48 and hydrogen peroxide alone a log reduction of 1.81.

The invention claimed is:

1. A reactor for the treatment of a liquid stream, the reactor comprising: a liquid stream inlet, a reaction zone for holding the liquid stream, at least one rotating contactor in the reaction in the reaction zone arranged to rotate through the liquid stream, and a liquid outlet, wherein the at least one rotating contactor includes a fabric mesh that includes an ion exchange material.

2. The reactor according to claim 1, wherein: the zone includes a headspace above the liquid steam, and wherein the at least one rotating contactor in the reaction zone is arranged to rotate through the liquid steam and the headspace.

3. The reactor according to claim 1, further comprising: means for introducing microwave energy to the reactor.

4. The reactor according to claim 1, further comprising: means for introducing microwave energy into the reactor, said means being configured to direct microwave energy into the headspace, and directly onto the at least one rotating contactor.

5. The reactor according to claim 4, wherein: the means for introducing microwave energy comprises at least one waveguide configured to introduce the microwave energy into the headspace.

6. The reactor according to claim 3, wherein: the means for introducing microwave energy are configured to introduce microwave energy at a plurality of locations along a length of the reactor.

7. The reactor according to claim 3, further comprising: at least one viewing window configured to be transparent to light but not permeable to microwaves.

8. The reactor according to claim 1, further comprising: means for introducing ultraviolet energy to the reactor.

9. The reactor according to claim 1, further comprising: one or more baffles.

10. The reactor according to claim 2, further comprising: a plate configured to separate the liquid stream from the headspace.

11. The reactor according to claim 1, wherein: the at least one rotating contactor is a disc.

12. The reactor according claim 1, wherein: there are at least two rotating contactors.

13. The reactor according to claim 12, wherein: the contactors are evenly spaced apart along a length of the reaction zone.

14. The reactor according to claim 1, wherein: at least one of the reactor and the at least one contactor are manufactured from a material comprising stainless steel, aluminium, polypropylene, polyethylene, polytetrafluoroethylene, glass reinforced polymer or mixtures thereof.

15. The reactor according to claim 1, wherein: the fabric mesh is provided on one face of the at least one rotating contactor.

16. The reactor according to claim 1, wherein:
, the fabric mesh is provided on two faces of the at least one contactor.

17. The reactor according to claim 1, wherein: the catalyst is a modified PAN fibrous catalyst.

18. The reactor according to claim 1, wherein: the ion exchange material is a fibrous ion exchange material, and the ion exchange material is a modified PAN fibrous ion exchange material.

19. The reactor according to claim 1, wherein: the fabric mesh includes a microwave absorbing material.

20. The reactor according to claim 19, wherein: the microwave absorbing material comprises carbon black, multi-walled carbon nanotube (MWCNT), graphene, titanium dioxide, strontium titanate, ferryl ions, steel, metal oxides, ceramic oxides or mixtures thereof.

21. The reactor according to claim 1, wherein: the fabric mesh further comprises one or more of an ultraviolet absorbing material and/or a microwave absorbing material.

22. The reactor according to claim 1, wherein: the liquid stream is a waste stream or a waste water stream.

23. A method of treating a liquid stream in a reactor as claimed in claim 1, the method comprising the steps of: feeding a liquid stream to the reactor through the liquid stream inlet; holding the liquid stream in the reaction zone for a residence time t1; rotating the one or more contactors in the reaction zone at angular velocity v1, thereby contacting the liquid with the fabric mesh on the contactors; and withdrawing liquid from the reactor through the liquid outlet.

24. The method according to claim 23, wherein: the liquid stream is dosed with an oxidant before entering the reaction zone, in the reaction zone and/or after leaving the reaction zone.

25. The method according to claim 24, wherein: the oxidant comprises a peroxygen compound, selected from hydrogen peroxide, hydrogen peroxide liberating compounds, hydrogen peroxide-generating compounds, organic and inorganic peroxyacids and salts thereof, and/or atmospheric oxygen.

26. The method according to claim 24, wherein: the oxidant is dosed in the liquid stream to give an oxidant concentration in the liquid stream of between 0.01-50 g/L of liquid stream.

27. The method according to claim 23, wherein: microwave energy is applied to the reaction zone, headspace or the at least one rotating contactor, at a frequency of 2.45 GHz or 915 MHz.

28. The method according to claim 23, wherein: t1 is in the range 0.1-48 hours, v1 is in between 0.1-180 degrees/second, and the temperature in the reaction zone is between 0-70° C.

29. The method according to claim 23, wherein: the pressure in the reaction zone is between 1-60 bar.

30. A reactor for the treatment of a liquid stream, the reactor comprising:
- a liquid stream inlet, a reaction zone for holding the liquid stream, at least one rotating contactor in the reaction zone arranged to rotate through the liquid stream, and liquid outlet, wherein the at least one rotating contactor includes a fabric mesh that includes an ion exchange material and a fibrous catalyst;
- wherein, the reaction zone includes a headspace above the liquid stream, and wherein the at least one rotating contactor in the reaction zone is arranged to rotate through the liquid stream and the headspace; and
- a plate configured to separate the liquid stream from the headspace.

31. A reactor for the treatment of a liquid stream, the reactor comprising: a liquid stream inlet, a reaction zone for holding the liquid stream, at least one rotating contactor in the reaction in the reaction zone arranged to rotate through the liquid stream, and a liquid outlet, wherein the at least one rotating contactor includes a fabric mesh that includes a fibrous catalyst and an ion exchange material.

* * * * *